US007214733B2

(12) United States Patent
Nakao

(10) Patent No.: US 7,214,733 B2
(45) Date of Patent: May 8, 2007

(54) POSITIVE TYPE RESIST COMPOSITION

(75) Inventor: Hajime Nakao, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 340 days.

(21) Appl. No.: 10/694,171

(22) Filed: Oct. 28, 2003

(65) Prior Publication Data

US 2004/0087694 A1 May 6, 2004

(30) Foreign Application Priority Data

Nov. 5, 2002 (JP) .......................... P.2002-321263

(51) Int. Cl.
*C08K 5/06* (2006.01)
*C08K 5/05* (2006.01)
*G03C 1/76* (2006.01)

(52) U.S. Cl. ...................... 524/376; 524/385; 524/291; 524/317; 524/320; 430/270.1

(58) Field of Classification Search ............ 430/270.1; 524/579, 379, 391, 376, 385, 291, 320, 317
See application file for complete search history.

(56) References Cited

U.S. PATENT DOCUMENTS 6,479,211 B1 * 11/2002 Sato et al. ............... 430/270.1
6,511,787 B2 * 1/2003 Harada et al. ........... 430/270.1
6,610,638 B1 * 8/2003 Tanigawa et al. ........... 510/171
6,673,518 B2 * 1/2004 Nishi et al. .............. 430/270.1
6,692,897 B2 * 2/2004 Fujimori et al. ......... 430/282.1
6,818,148 B1 * 11/2004 Watanabe et al. .......... 252/79.1

FOREIGN PATENT DOCUMENTS

JP 2000-159758 A 6/2000
WO WO 00/58252 A1 * 10/2000

OTHER PUBLICATIONS

Allen, Robert D. et al. High performance acrylic polymers for chemically amplified photoresist applications, J. Vac. Sci. Technol. B 9(6), Nov./Dec. 1991, pp. 3357-3361.

* cited by examiner

*Primary Examiner*—David W. Wu
*Assistant Examiner*—Rip A. Lee
(74) *Attorney, Agent, or Firm*—Sughrue Mion, PLLC

(57) ABSTRACT

A positive type resist composition comprising: (A) a resin having a monocyclic or polycyclic alicyclic hydrocarbon structure, which increases the solubility in an alkali developing solution by the action of an acid; (B) a compound capable of generating an acid upon irradiation with an actinic ray or a radiation; and (C) an alkoxy alcohol as a solvent, wherein an alkoxy group and an alcoholic hydroxyl group are connected to each other via at least three carbons.

12 Claims, No Drawings

POSITIVE TYPE RESIST COMPOSITION

FIELD OF THE INVENTION

The present invention relates to a positive type resist composition that is used in the manufacture step of semiconductors such as IC, the manufacture of circuit boards of liquid crystals, thermal heads, etc., and other photofabrication steps. More particularly, the invention relates to a positive type resist composition that is suitable in the case where far ultraviolet rays of not longer than 250 nm and the like are used as an exposure light source.

BACKGROUND OF THE INVENTION

Chemically amplified positive type resist compositions are a pattern forming material in which upon irradiation with a radiation such as far ultraviolet rays, an acid is formed in exposed areas, and reaction of the acid with a catalyst changes solubility of irradiated areas and non-irradiated areas with active a radiation against a developing solution, thereby forming a pattern on a board.

In the case where a KrF excimer laser is used as an exposure light source, since a resin comprising, as a basic skeleton, poly(hydroxystyrene) exhibiting small absorption mainly in a region of 248 nm is used as the major component, the resulting system has high sensitivity and high resolution and forms a good pattern, and becomes a good system as compared with the conventional naphthoquinonediazide/novolak resin systems.

However, in the case where a light source of a shorter wavelength, such as an ArF excimer laser (193 nm), is used as the exposure light source, since an aromatic group-containing compound essentially exhibits large absorption in a region of 193 nm, even the foregoing chemically amplified systems were not satisfactory.

Utilization of a poly(meth)acrylate as a polymer exhibiting small absorption in the wavelength region of 193 nm is described in *J. Vac. Sci. Technol.*, B9, 3357 (1991). However, there was a problem that this polymer is low in resistance to dry etching that is generally carried out in the manufacture step of semiconductors as compared with the conventional aromatic group-containing phenol resins.

JP-A-2000-159758 discloses a resist for ArF excimer laser containing a resin having a specific lactone structure. However, the conventional resists for ArF excimer laser involved a problem such that the sensitivity fluctuates with time.

Also, the conventional resists for ArF excimer laser involved a problem in spreading property of a developing solution during development (easiness in spreading of a developing solution during development). That is, in the conventional resists for ArF excimer laser, there was some possibility that the resist film repels the developing solution during development. For this reason, there was a problem that the developing solution falls down from a silicon wafer during spreading of the developing solution, thereby wasting the developing solution. This problem becomes remarkable with the advance of enlargement in size of a silicon wafer to be used. Therefore, there have been demanded resists in which the developing solution can be spread more smoothly within a short period of time.

SUMMARY OF THE INVENTION

An object of the invention is to provide a positive type resist composition capable of suppressing change in sensitivity with of time and having excellent affinity for developer during development.

The invention has the following constructions, whereby the foregoing object of the invention is attained.

(1) A positive type resist composition comprising:

(A) a resin having a monocyclic or polycyclic alicyclic hydrocarbon structure, which increases the solubility in an alkali developing solution by the action of an acid;

(B) a compound capable of generating an acid upon irradiation with an actinic ray or a radiation; and (C) an alkoxy alcohol as a solvent, wherein an alkoxy group and an alcoholic hydroxyl group are connected to each other via at least three carbons.

(2) The composition according to the above (1), wherein the solvent (C) further contains a propylene glycol monoalkyl ether carboxylate.

(3) The composition according to the above (2), wherein the solvent (C) contains from 10 to 50% by weight of the alkoxy alcohol and from 50 to 90% by weight of the propylene glycol monoalkyl ether carboxylate.

(4) The composition according to the above (1), wherein the alkoxy alcohol is 3-methoxybutanol.

(5) The composition according to the above (2), wherein the propylene glycol monoalkyl ether carboxylate is propylene glycol monomethyl ether acetate.

(6) The composition according to the above (1), wherein the resin (A) comprises a repeating unit having a group represented by the following formula (I):

(I)

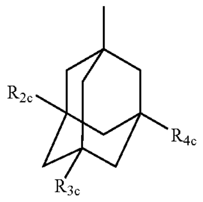

wherein $R_{2c}$, $R_{3c}$, and $R_{4c}$ each independently represents a hydrogen atom or a hydroxyl group, provided that at least one of $R_{2c}$, $R_{3c}$, and $R_{4c}$ represents a hydroxyl group.

(7) The composition according to the above (1), wherein the resin (A) comprises a repeating unit having an alkali-soluble group protected by a 2-alkyl-2-adamantyl group or a 1-adamantyl-1-alkylalkyl group.

(8) The composition according to claim 1, wherein the compound (B) is a compound capable of generating a perfluorobutanesuflonic acid or a perfluorooctanesulfonic acid upon irradiation with an actinic ray or a radiation.

(9) The composition according to the above (1), wherein the alkoxy group and the alcoholic hydroxyl group are connected to each other via from 3 to 10 carbons.

(10) The composition according to the above (1), wherein the alkoxy alcohol has a boiling point of from 120 to 220° C.

(11) The composition according to the above (1), further comprising (D) a nitrogen-containing basic compound:

(12) The composition according to the above (1), further comprising (E) a fluorine based and/or silicon based surfactant.

(13) A method for forming a pattern, which comprises forming a resist film comprising the composition described in the above (1), exposing the resist film upon irradiation with the actinic rays or a radiation, and subsequently developing the resist film.

DETAILED DESCRIPTION OF THE INVENTION

The invention will be hereunder described in detail.

[1] (A) Resin Having a Monocyclic or Polycyclic Alicyclic Hydrocarbon Structure, Which Increases the Solubility in an Alkali Developing Solution by the Action of an Acid:

The positive type resist composition of the invention comprises a resin having a monocyclic or polycyclic alicyclic hydrocarbon structure, which increases the solubility in an alkali developing solution by the action of an acid (the resin being hereinafter often referred to as "acid decomposable resin").

The acid decomposable resin is preferably a resin having a repeating unit having a partial structure containing an alicyclic hydrocarbon represented by any one of the following formulae (pI) to (pVI), which increases the solubility in an alkali developing solution by the action of an acid.

(pI)

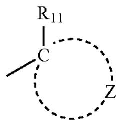

(pII)

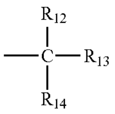

(pIII)

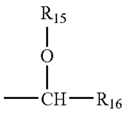

(pIV)

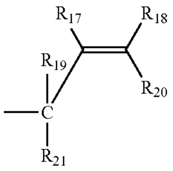

(pV)

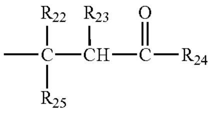

(pVI)

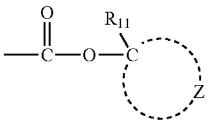

In the formulae, $R_{11}$ represents a methyl group, an ethyl group, an n-propyl group, an isopropyl group, an n-butyl group, an isobutyl group, or a sec-butyl group, and Z represents an atomic group necessary for forming an alicyclic hydrocarbon group together with the carbon atom.

$R_{12}$ to $R_{16}$ each independently represents a linear or branched alkyl group or alicyclic hydrocarbon group having from 1 to 4 carbon atoms, provided that at least one of $R_{12}$ to $R_{14}$, or either $R_{15}$ or $R_{16}$ represents an alicyclic hydrocarbon group.

$R_{17}$ to $R_{21}$ each independently represents a hydrogen atom or a linear or branched alkyl group or alicyclic hydrocarbon group having from 1 to 4 carbon atoms, provided that at least one of $R_{17}$ to $R_{21}$ represents an alicyclic hydrocarbon group. Also, either $R_{19}$ or $R_{21}$ represents a linear or branched alkyl group or alicyclic hydrocarbon group having from 1 to 4 carbon atoms.

$R_{22}$ to $R_{25}$ each independently represents a linear or branched alkyl group or alicyclic hydrocarbon group having from 1 to 4 carbon atoms, provided that at least one of $R_{22}$ to $R_{22}$ represents an alicyclic hydrocarbon group. Also, $R_{23}$ and $R_{24}$ may be bonded to each other to form a ring.

In the formulae (pI) to (pVI), the alkyl group represented by $R_{12}$ to $R_{25}$ represents a substituted or unsubstituted, linear or branched alkyl group having from 1 to 4 carbon atoms. Examples of the alkyl group include a methyl group, an ethyl group, an n-propyl group, an isopropyl group, an n-butyl group, an isobutyl group, a sec-butyl group, and a t-butyl group.

Also, examples of substituents on the alkyl group include an alkoxy group having from 1 to 4 carbon atoms, a halogen atom (such as a fluorine atom, a chlorine atom, a bromine atom, and an iodine atom), an acyl group, an acyloxy group, a cyano group, a hydroxyl group, a carboxy group, an alkoxycarbonyl group, and a nitro group.

The alicyclic hydrocarbon group represented by $R_{11}$ to $R_{25}$ or the alicyclic hydrocarbon group formed by Z and the carbon atom may be monocyclic or polycyclic. Specifically, groups having a monocyclic, bicyclic, tricyclic, or tetracyclic structure having 5 or more carbon atoms are enumerated. The number of carbon atoms is preferably from 6 to 30, and especially preferably from 7 to 25. These alicyclic hydrocarbon groups may have a substituent.

Of the alicyclic hydrocarbon groups, examples of the structure of the alicyclic moiety will be given below.

(1)

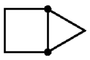

(2)

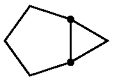

(3)

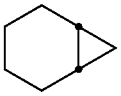

(4)

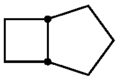

(5)

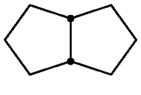

(6)

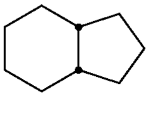

-continued
(7)
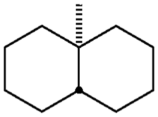
(8)
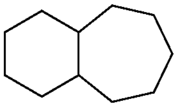
(9)
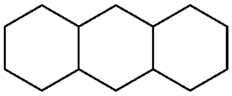
(10)
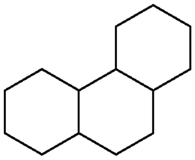
(11)
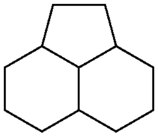
(12)
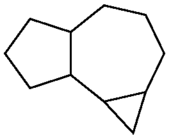
(13)
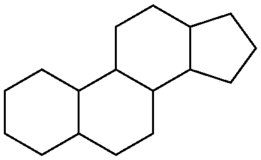
(14)
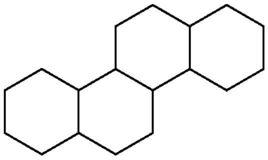
(15)
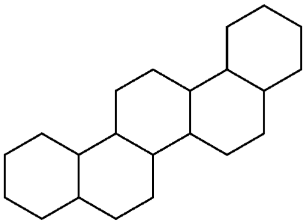
(16)
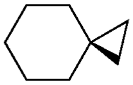
(17)
-continued
(18)
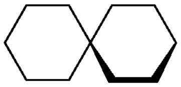
(19)
(20)
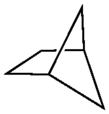
(21)
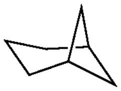
(22)
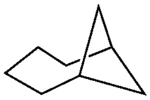
(23)
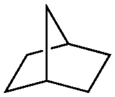
(24)
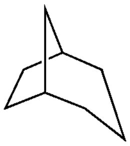
(25)
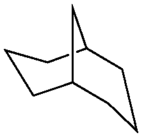
(26)
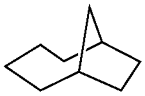
(27)
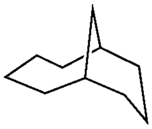
(28)
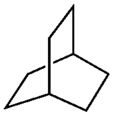
(29)
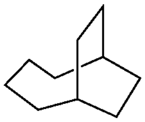
(30)
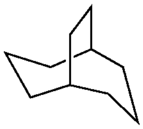

-continued (31)

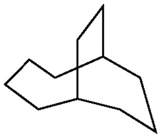

(32)

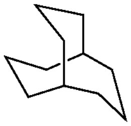

(33)

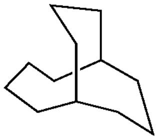

(34)

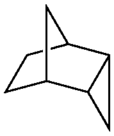

(35)

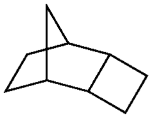

(36)

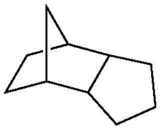

(37)

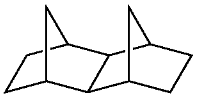

(38)

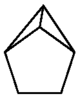

(39)

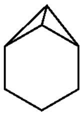

(40)

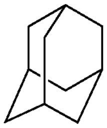

(41)

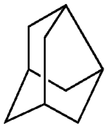

(42)

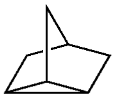

-continued (43)

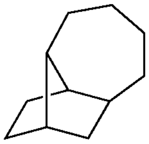

(44)

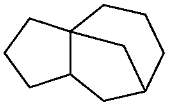

(45)

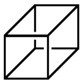

(46)

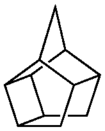

(47)

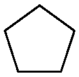

(48)

(49)

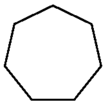

(50)

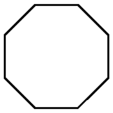

In the invention, preferred examples of the alicyclic moiety that can be used include an adamantyl group, a noradamantyl group, a decalin residue, a tricyclodecanyl group, a tetracyclododecanyl group, norbornyl group, a cedrol group, a cyclohexyl group, a cycloheptyl group, a cyclooctyl group, a cyclododecanyl group, and a cyclododecanyl group. Above all, an adamantyl group, a decalin residue, a norbornyl group, a cedrol group, a cyclohexyl group, a cycloheptyl group, a cyclooctyl group, a cyclodecanyl group, and a cyclododecanyl group are more preferable.

Examples of substituents on these alicyclic hydrocarbon groups include an alkyl group, a substituted alkyl group, a halogen atom, a hydroxyl group, an alkoxy group, a carboxyl group, and an alkoxycarbonyl group. As the alkyl group, lower alkyl groups such as a methyl group, an ethyl group, a propyl group, an isopropyl group, and a butyl group are preferable, and a substituent selected from the group consisting of a methyl group, an ethyl group, a propyl group, and an isopropyl group is more preferable. Examples of substituents of the substituted alkyl group include a hydroxyl group, a halogen atom, and an alkoxy group. Examples of the alkoxy group include ones having from 1 to 4 carbon atoms such as a methoxy group, an ethoxy group, a propoxy group, and a butoxy group.

The structure represented by any one of the formulae (pI) to (pVI) in the foregoing resin can be used for protecting an alkali-soluble group. As the alkali-soluble group, various groups that are known in this technical field are numerated.

Specific examples include a carboxylic acid group, a sulfonic acid group, a phenol group, and a thiol group, with a carboxylic acid group and a sulfonic group being preferable.

Preferred examples of the alkali-soluble group protected by the structure represented by any one of the formulae (pI) to (pVI) in the foregoing resin include groups represented by the following formulae (pVII) to (pXI):

(pVII)

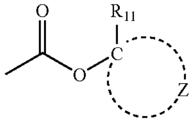

(pVIII)

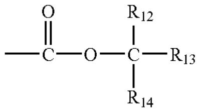

(pIX)

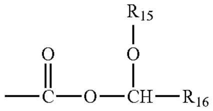

(pX)

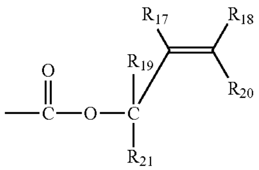

(pXI)

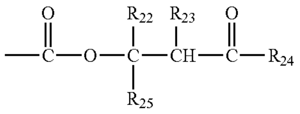

Here, $R_{11}$ to $R_{25}$ and Z are the same as defined above.

In the foregoing resin, as the repeating unit having an alkali-soluble group protected by the structure represented by any one of the formulae (pI) to (pVI), a repeating unit represented by the following formula (pA) is preferable.

(pA)

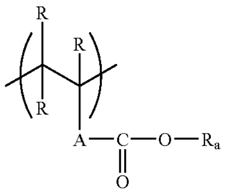

Here, R represents a hydrogen atom, a halogen atom, or a substituted or unsubstituted, linear or branched alkyl group having from 1 to 4 carbon atoms. Plural Rs may be the same or different.

A represents a single group selected from the group consisting of a single bond, an alkylene group, a substituted alkylene group, an ether group, a thioether group, a carbonyl group, an ester group, an amide group, a sulfonamide group, a urethane group, and a urea group, or a combination of two or more groups thereof.

Ra represents a group represented by any one of the foregoing formulae (pI) to (pVI).

Specific examples of monomers corresponding to the repeating unit represented by the formula (pA) will be given below.

1

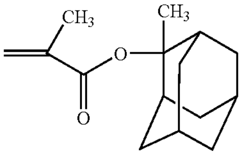

2

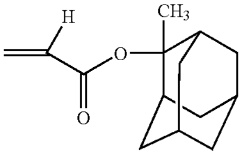

3

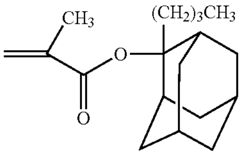

4

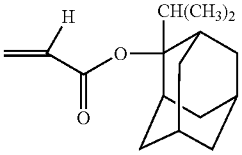

5

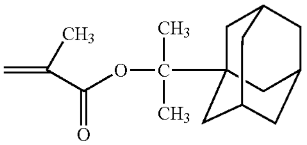

6

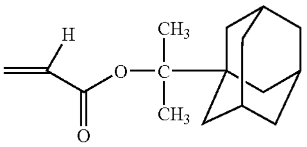

7

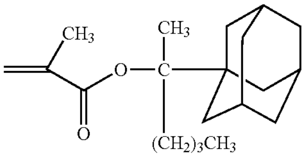

-continued
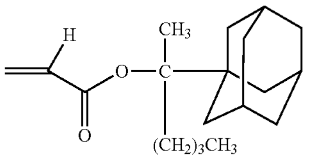
8
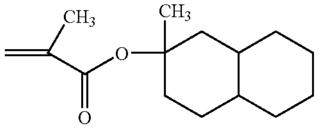
9
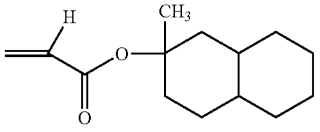
10
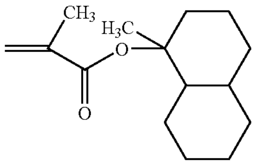
11
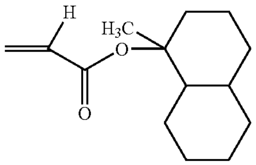
12
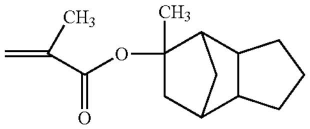
13
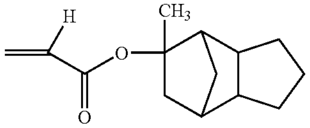
14
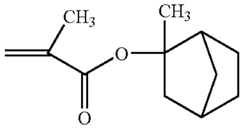
15
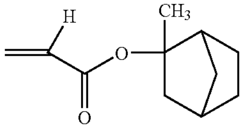
16
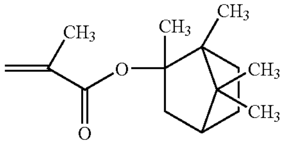
17
-continued
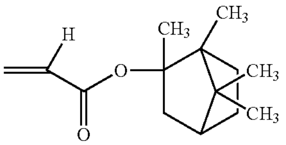
18
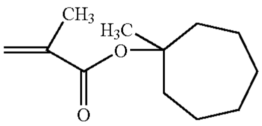
19
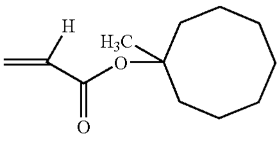
20
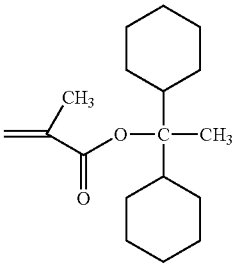
21
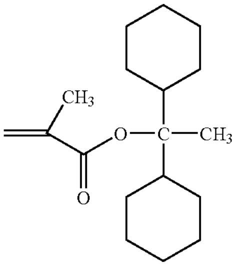
22
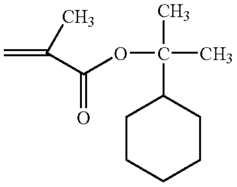
23
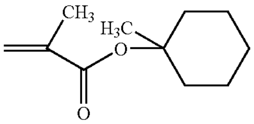
24
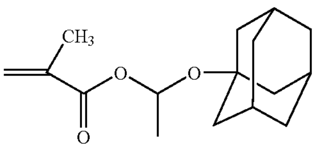
25
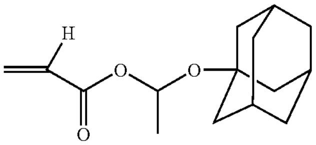
26

-continued

27

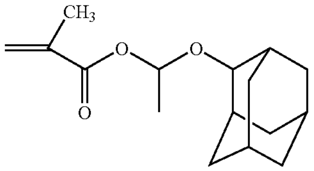

28

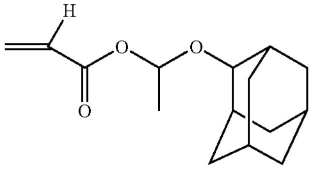

29

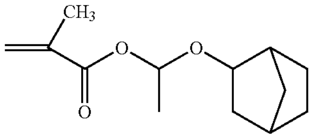

30

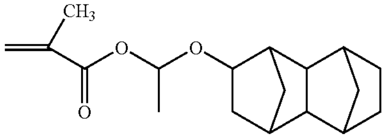

31

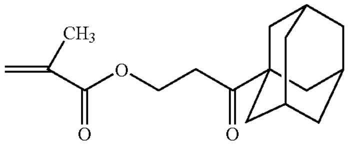

32

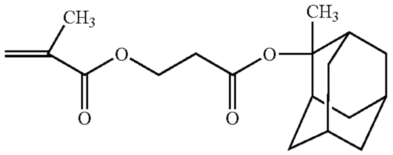

It is preferable that the acid decomposable resin has a repeating unit having an alkali-soluble group protected by a 2-alkyl-2-adamantyl group such as repeating units formed by the foregoing Monomers 1 to 4 and 32.

It is preferable that the acid decomposable resin has a repeating unit having an alkali-soluble group protected by a 1-adamantyl-1-alkylalkyl group such as repeating units formed by the foregoing Monomers 5 to 8.

The resin according to the invention contains a group that is insoluble or sparingly soluble in alkalis and is decomposed by the action of an acid to become alkali-soluble (the group being hereinafter often referred to as "acid decomposable group").

The acid decomposable group can be contained in at least one repeating unit of repeating units having a partial structure containing the alicyclic hydrocarbon groups represented by any one of the foregoing formulae (pI) to (pVI) and repeating units of copolymerization components as described later.

The structure of the acid decomposable group is represented by $-C(=O)-X_1-R_0$.

Here, examples of $R_0$ include a tertiary alkyl group (such as a t-butyl group and a t-amyl group), a 1-alkoxyethyl group (such as an isoboronyl group, a 1-ethoxyethyl group, a 1-butoxyethyl group, a 1-isobutoxyethyl group, and a 1-cyclohexyloxyethyl hexyloxyethyl group), an alkoxymethyl group (such as a 1-methoxymethyl group and a 1-ethoxymethyl group), a 3-oxoalkyl groups, a tetrahydropyranyl group, a tetrahydrofuranyl group, a trialkylsilyl ester group, a 3-oxocyclohexyl ester group, a 2-methyl-2-adamantyl group, and a mevalonic lactone residue. $X_1$ represents an oxygen atom, a sulfur atom, $-NH-$, $-NHSO_2-$, or $-NHSO_2NH-$.

It is preferable that the acid decomposable resin further has a repeating unit having a group represented by the following formula (I).

(I)

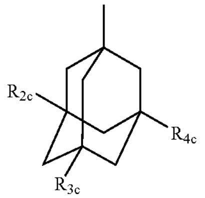

In the formula (I), $R_{2c}$, $R_{3c}$, and $R_{4c}$ each independently represents a hydrogen atom or a hydroxyl group, provided that at least one of $R_{2c}$, $R_{3c}$, and $R_{4c}$ represents a hydroxyl group.

The group represented by the formula (I) is preferably a dihydroxy body or a monohydroxy body, and more preferably a dihydroxy body.

As the repeating unit having a group represented by the formula (I), repeating units represented by the following formula (AII) are enumerated.

(AII)

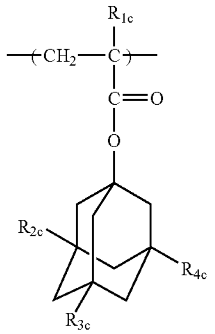

In the formula (AII), $R_{1c}$ represents a hydrogen atom or a methyl group.

$R_{2c}$, $R_{3c}$, and $R_{4c}$ each independently represents a hydrogen atom or a hydroxyl group, provided that at least one of $R_{2c}$, $R_{3c}$, and $R_{4c}$ represents a hydroxyl group.

Specific examples of the repeating unit having a structure represented by the formula (AII) will be given below, but it should not be construed that the invention is limited thereto.

(1)

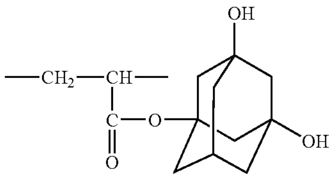

(2)

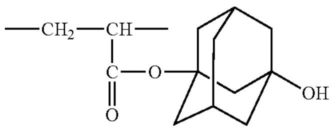

(3)

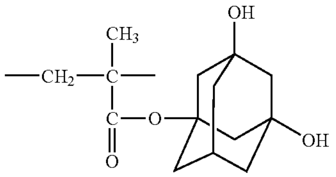

(4)

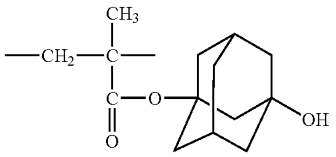

The acid decomposable resin can further comprise a repeating unit having a lactone structure represented by the following formula (IV).

(IV)

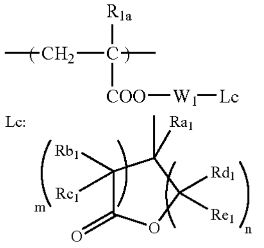

In the formula (IV), $R_{1a}$ represents a hydrogen atom or a methyl group.

$W_1$ represents a single group selected from the group consisting of a single bond, an alkylene group, an ether group, a thioether group, a carbonyl group, and an ester group, or a combination of two or more groups thereof.

$Ra_1$, $Rb_1$, $Rc_1$, $Rd_1$, and $Re_1$ each independently represents a hydrogen atom or an alkyl group having from 1 to 4 carbon atoms. m and n each independently represents an integer of from 0 to 3, and (m+n) is from 2 to 6.

Examples of the alkyl group having from 1 to 4 carbon atoms, as represented by $Ra_1$, $Rb_1$, $Rc_1$, $Rd_1$, and $Re_1$, include a methyl group, an ethyl group, a propyl group, an isopropyl group, an n-butyl group, an isobutyl group, a sec-butyl group, and a t-butyl group.

In the formula (IV), as the alkylene group represented by $W_1$, groups represented by the following formula are enumerated.

$$-[C(Rf)(Rg)]_{r1}-$$

In the foregoing formula, Rf and Rg may be the same or different and each represents a hydrogen atom, an alkyl group, a substituted alkyl group, a halogen atom, a hydroxyl group, or an alkoxy group. As the alkyl group, lower alkyl groups such as a methyl group, an ethyl group, a propyl group, an isopropyl group, and a butyl group are preferable. More preferably, the alkyl group is selected from a methyl group, an ethyl group, a propyl group, and an isopropyl group. Examples of substituents of the substituted alkyl group include a hydroxyl group, a halogen atom, and an alkoxy group. Examples of the alkoxy group include ones having from 1 to 4 carbon atoms such as a methoxy group, an ethoxy group, a propoxy group, and a butoxy group. Examples of the halogen atom include a chlorine atom, a bromine atom, a fluorine atom, and an iodine atom. r1 represents an integer of from 1 to 10.

Examples of further substituents on the foregoing alkyl group include a carboxyl group, an acyloxy group, a cyano group, an alkyl group, a substituted alkyl group, a halogen atom, a hydroxyl group, an alkoxy group, a substituted alkoxy group, an acetylamide group, an alkoxycarbonyl group, and an acyl group.

Here, examples of the alkyl group include lower alkyl groups such as a methyl group, an ethyl group, a propyl group, an isopropyl group, a butyl group, a cyclopropyl group, a cyclobutyl group, and a cyclopentyl group. Examples of substituents of the substituted alkyl group include a hydroxyl group, a halogen atom, and an alkoxy group. Examples of substituents of the substituted alkoxy group include an alkoxy group. Examples of the alkoxy group include ones having from 1 to 4 carbon atoms such as a methoxy group, an ethoxy group, a propoxy group, and a butoxy group. Examples of the acyloxy group include an acetoxy group. Examples of the halogen atom include a chlorine atom, a bromine atom, a fluorine atom, and an iodine atom.

Specific examples of the repeating unit represented by the formula (IV) will be given below, but it should not be construed that the invention is limited thereto.

(IV-1)

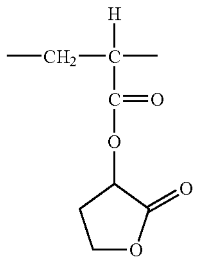

(IV-2)

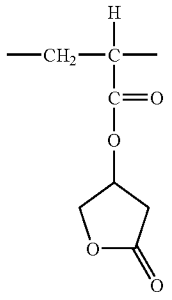

-continued
(IV-3)
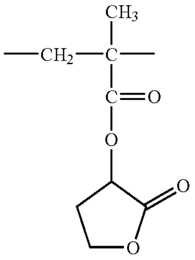
(IV-4)
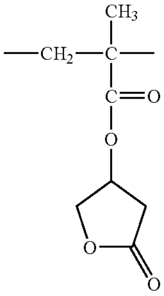
(IV-5)
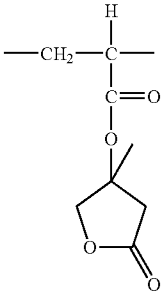
(IV-6)
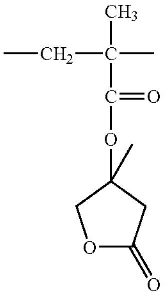
(IV-7)
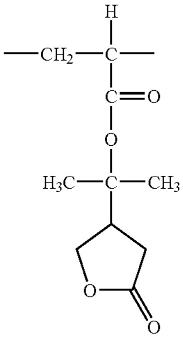
-continued
(IV-8)
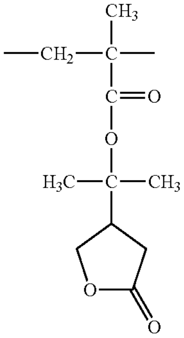
(IV-9)
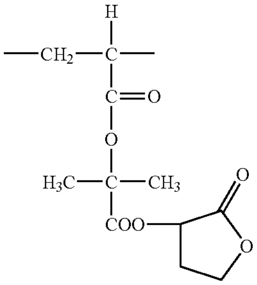
(IV-10)
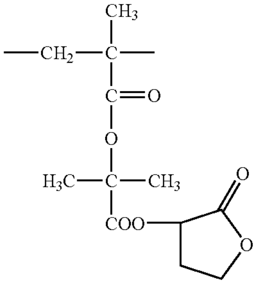
(IV-11)
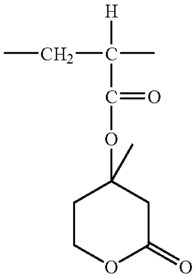
(IV-12)
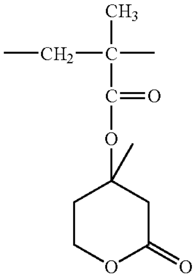

-continued
(IV-13)
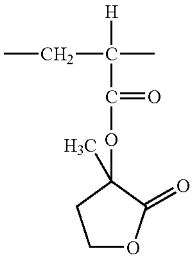
(IV-14)
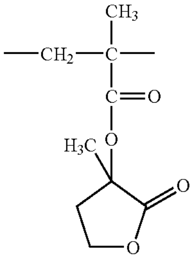
(IV-15)
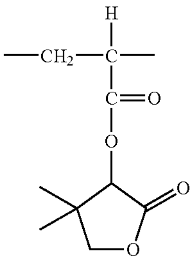
(IV-16)
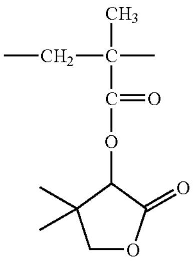
(IV-17)
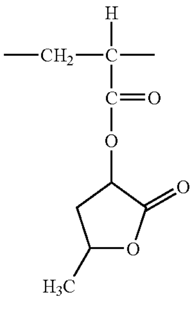
-continued
(IV-18)
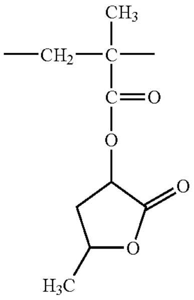
(IV-19)
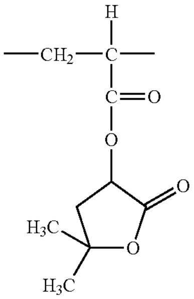
(IV-20)
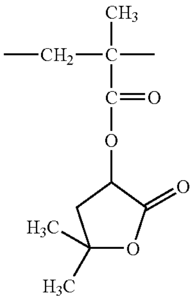
(IV-21)
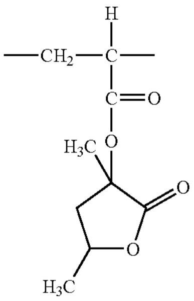
(IV-22)
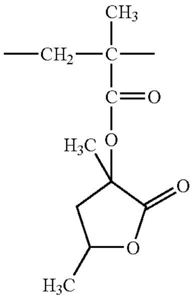

-continued
(IV-23)
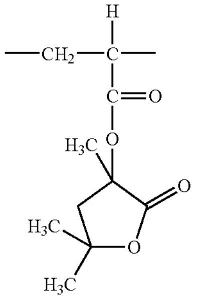
(IV-24)
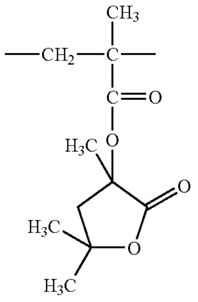
(IV-25)
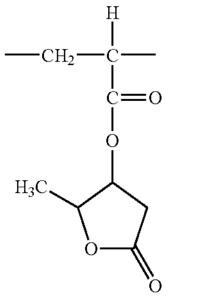
(IV-26)
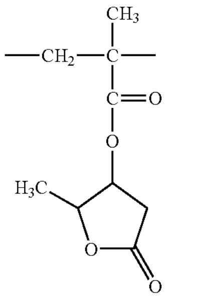
(IV-27)
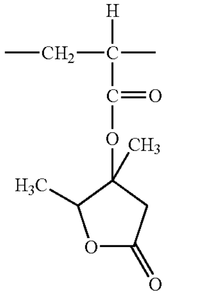
-continued
(IV-28)
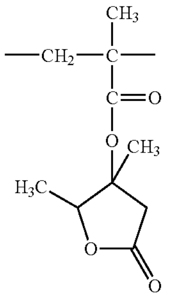
(IV-29)
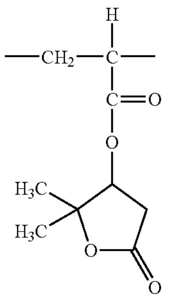
(IV-30)
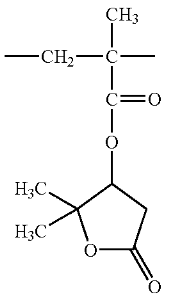
(IV-31)
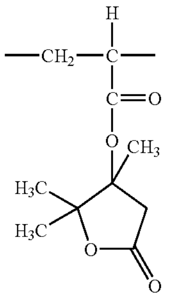
(IV-32)
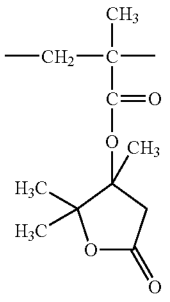

-continued (IV-33)

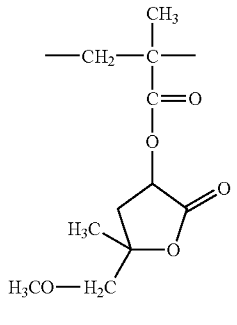

(IV-34)

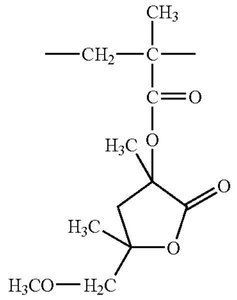

(IV-35)

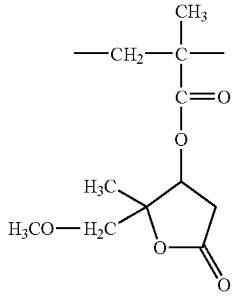

(IV-36)

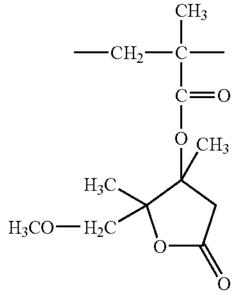

In the foregoing specific examples of the formula (IV), (IV-17) to (IV-36) are preferable from the standpoint of good exposure margin.

Further, as the structure of the formula (IV), ones having an acrylate structure are preferable from the standpoint of good edge roughness.

Also, a repeating unit having a group represented by any one of the following formulae (V-1) to (V-4) may be contained.

(V-1)

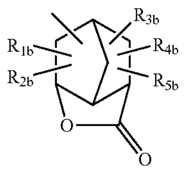

(V-2)

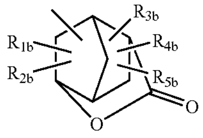

(V-3)

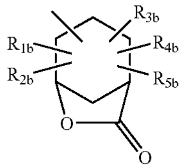

(V-4)

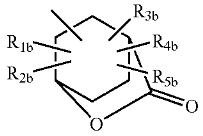

In the formulae (V-1) to (V-4), $R_{1b}$, $R_{2b}$, $R_{3b}$, $R_{4b}$, and $R_{5b}$ each independently represents a hydrogen atom or an optionally substituted alkyl group, cycloalkyl group or alkenyl group. Two of $R_{1b}$, $R_{2b}$, $R_{3b}$, $R_{4b}$, and $R_{5b}$ may be bonded to each other to form a ring.

In the formulae (V-1) to (V-4), examples of the alkyl group represented by $R_{1b}$, $R_{2b}$, $R_{3b}$, $R_{4b}$, and $R_{5b}$ include a linear or branched alkyl group which may have a substituent.

The linear or branched alkyl group is preferably a linear or branched alkyl group having from 1 to 12 carbon atoms, more preferably a linear or branched alkyl group having from 1 to 10 carbon atoms, and further preferably a methyl group, an ethyl group, a propyl group, an isopropyl group, an n-butyl group, an isobutyl group, a sec-butyl group, a t-butyl group, a pentyl group, a hexyl group, a heptyl group, an octyl group, a nonyl group, or a decyl group.

Examples of the cycloalkyl group represented by $R_{1b}$, $R_{2b}$, $R_{3b}$, $R_{4b}$, and $R_{5b}$ include ones having from 3 to 8 carbon atoms such as a cyclopropyl group, a cyclopentyl group, a cyclohexyl group, a cycloheptyl group, and a cyclooctyl group.

Examples of the alkenyl group represented by $R_{1b}$, $R_{2b}$, $R_{3b}$, $R_{4b}$, and $R_{5b}$ include ones having from 2 to 6 carbon atoms such as a vinyl group, a propenyl group, a butenyl group, and a hexenyl group.

Also, examples of the ring formed by bonding of two of $R_{1b}$, $R_{2b}$, $R_{3b}$, $R_{4b}$, and $R_{5b}$ include 3-membered to 8-membered rings such as a cyclopropane ring, a cyclobutane ring, a cyclopentane ring, a cyclohexane ring, and a cyclooctane ring.

Incidentally, in the formulae (V-1) to (V-4), each of $R_{1b}$, $R_{2b}$, $R_{3b}$, $R_{4b}$, and $R_{5b}$ may be connected to any of the carbon atoms constituting the ring skeleton.

Examples of substituents that each of the foregoing alkyl group, cycloalkyl group and alkenyl group may have include an alkoxy group having from 1 to 4 carbon atoms, a halogen atom (such as a fluorine atom, a chlorine atom, a bromine atom, and an iodine atom), an acyl group having from 2 to 5 carbon atoms, an acyloxy group having from 2 to 5 carbon atoms, a cyano group, a hydroxyl group, a carboxy group, an alkoxycarbonyl group having from 2 to 5 carbon atoms, and a nitro group.

As the repeating unit having a group represented by any one of the formulae (V-1) to (V-4), repeating units represented by the following formula (AI) are enumerated.

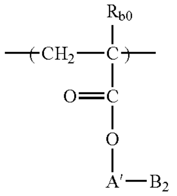

(AI)

In the formula (AI), $R_{b0}$ represents a hydrogen atom, a halogen atom, or a substituted or unsubstituted alkyl group having from 1 to 4 carbon atoms. As substituents that the alkyl group represented by $R_{b0}$ may have, are enumerated those enumerated previously as the preferred substituent that the alkyl group represented by $R_{1b}$ in the foregoing formulae (V-1) to (V-4) may have.

Examples of the halogen atom represented by $R_{b0}$ include a fluorine atom, a chlorine atom, a bromine atom, and an iodine atom. $R_{b0}$ is preferably a hydrogen atom.

A' represents a single bond, an ether group, an ester group, a carbonyl group, an alkylene group, or a divalent group comprising a combination thereof.

$B_2$ represents a group represented by any one of the formulae (V-1) to (V-4). In A', examples of the divalent group comprising a combination include ones represented by the following formulae.

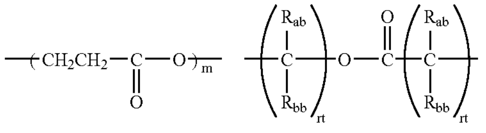

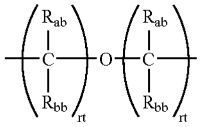

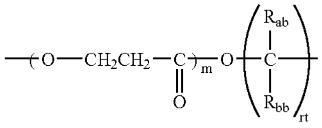

-continued

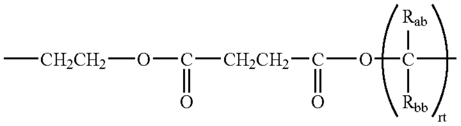

In the foregoing formulae, $R_{ab}$ and $R_{bb}$ may be the same or different and each represents a hydrogen atom, an alkyl group, a substituted alkyl group, a halogen atom, a hydroxyl group, or an alkoxy group.

As the alkyl group, lower alkyl groups such as a methyl group, an ethyl group, a propyl group, an isopropyl group, and a butyl group are preferable, and a substituent selected from a methyl group, an ethyl group, a propyl group, and an isopropyl group is more preferable. Examples of substituents of the substituted alkyl group include a hydroxyl group, a halogen atom, and an alkoxy group having from 1 to 4 carbon atoms.

Examples of the alkoxy group include ones having from 1 to 4 carbon atoms such as a methoxy group, an ethoxy group, a propoxy group, and a butoxy group. Examples of the halogen atom include a chlorine atom, a bromine atom, a fluorine atom, and an iodine atom. r1 represents an integer of from 1 to 10, and preferably an integer of from 1 to 4. m represents an integer of from 1 to 3, and preferably 1 or 2.

Specific examples of the repeating unit represented by the formula (AI) will be given below, but it should not be construed that the invention is limited thereto.

(Ib-1)

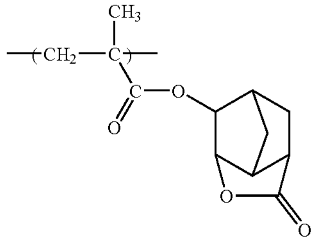

(Ib-2)

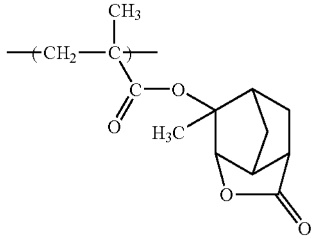

(Ib-3)

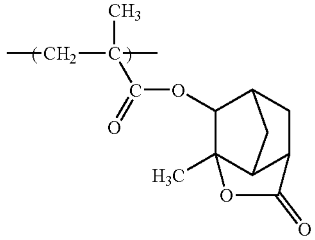

-continued
(Ib-4)
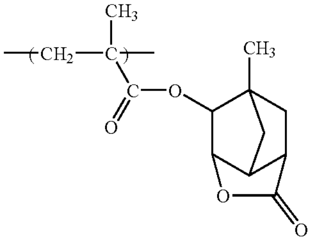
(Ib-5)
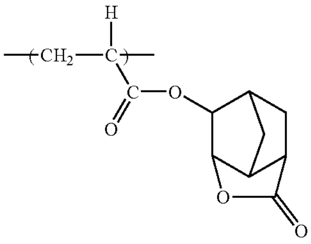
(Ib-6)
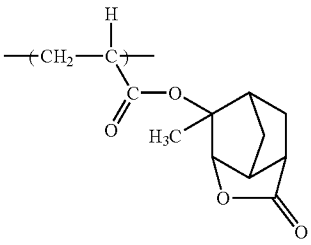
(Ib-7)
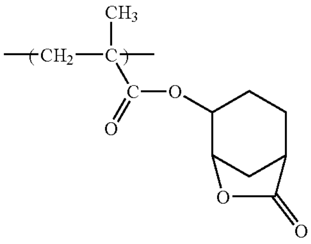
(Ib-8)
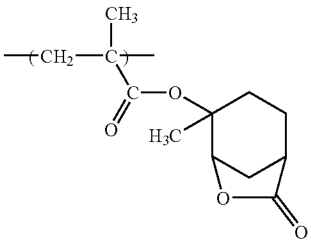
(Ib-9)
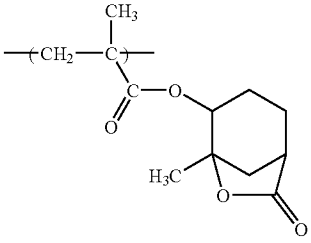
-continued
(Ib-10)
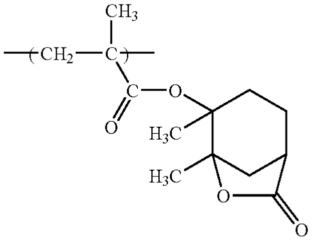
(Ib-11)
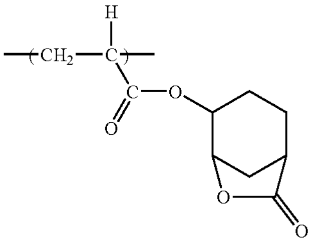
(Ib-12)
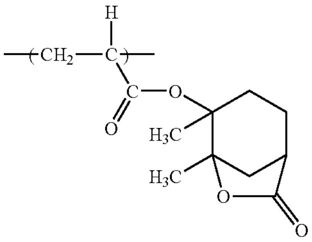
(Ib-13)
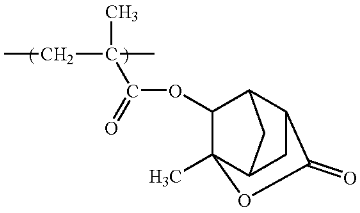
(Ib-14)
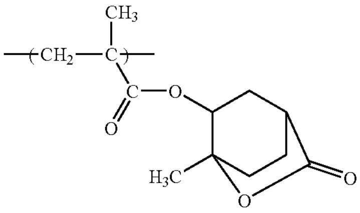
(Ib-15)
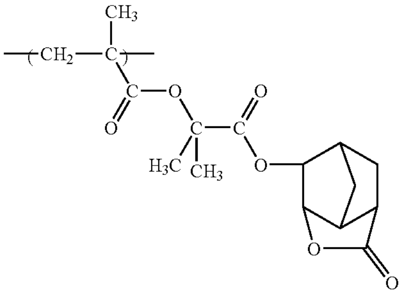

-continued
(Ib-16)
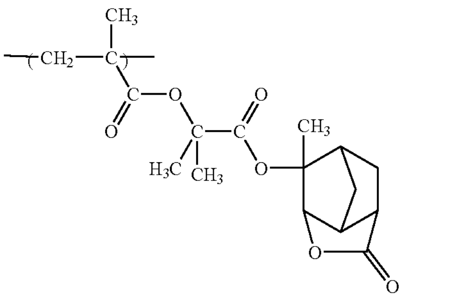
(Ib-17)
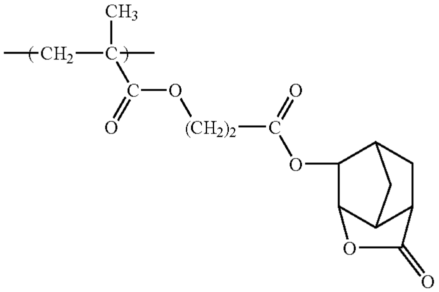
(Ib-18)
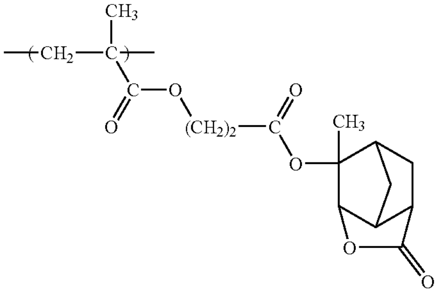
(Ib-19)
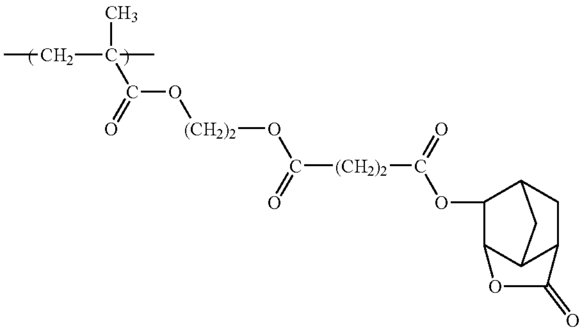
(Ib-20)
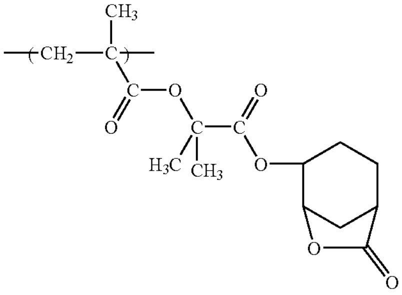
-continued
(Ib-21)
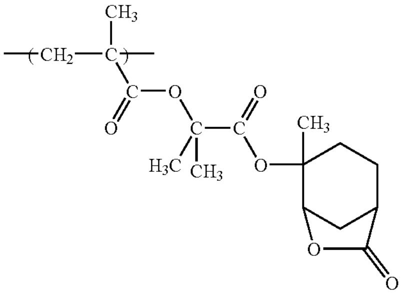
(Ib-22)
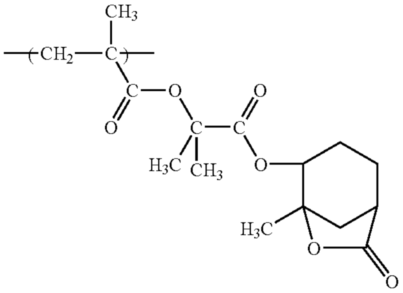
(Ib-23)
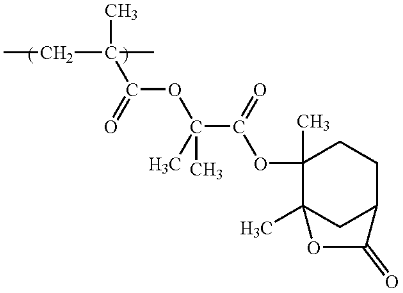
(Ib-24)
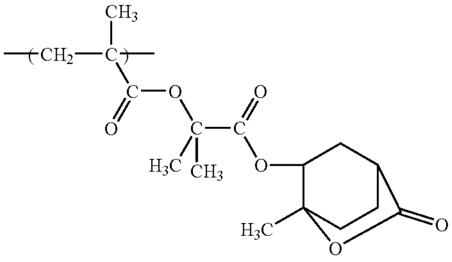
(Ib-25)
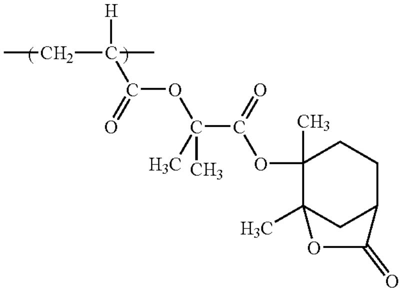

-continued (Ib-26)

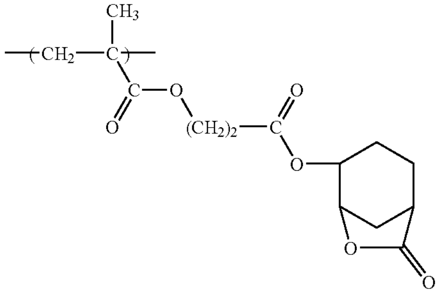

(Ib-27)

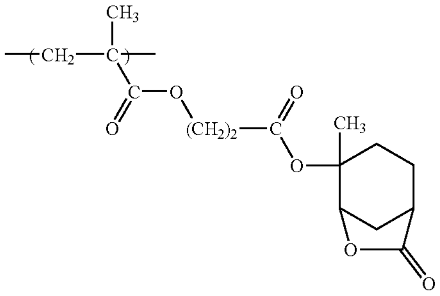

(Ib-28)

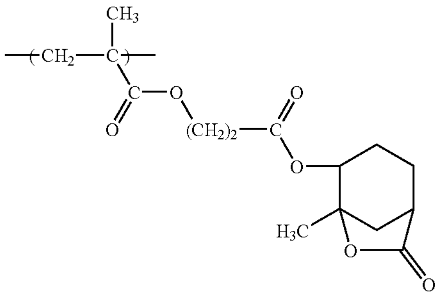

(Ib-29)

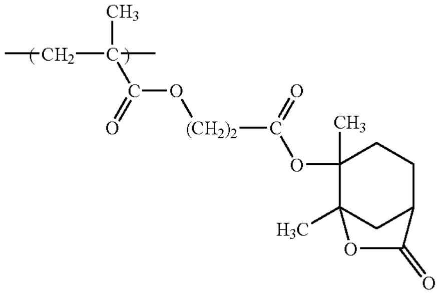

(Ib-30)

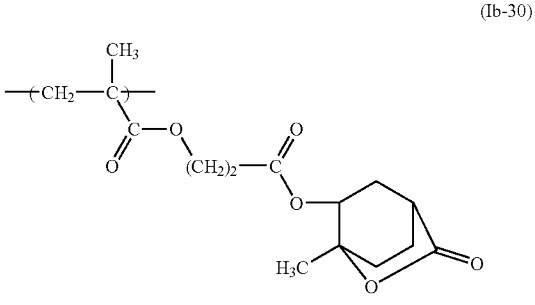

-continued (Ib-31)

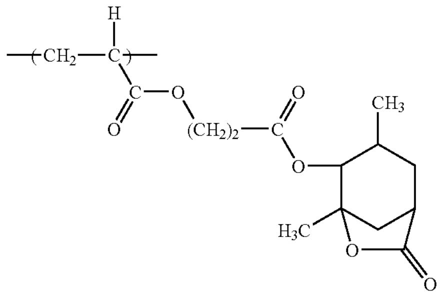

Also, the acid decomposable resin of the invention can further contain a repeating unit represented by the following formula (VI).

(VI)

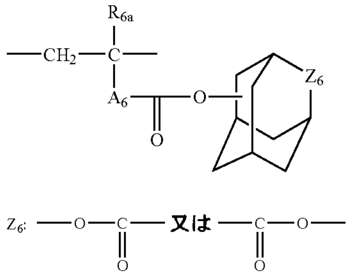

In the formula (VI), $A_6$ represents a single group selected from the group consisting of a single bond, an alkylene group, a cycloalkylene group, an ether group, a thioether group, a carbonyl group, and an ester group, or a combination of two or more groups thereof.

$R_{6a}$ represents a hydrogen atom, an alkyl group having from 1 to 4 carbon atoms, a cyano group, or a halogen atom.

In the formula (VI), as the alkylene group represented by $A_6$, groups represented by the following formula are enumerated.

$$—[C(Rnf)(Rng)]_r—$$

In the foregoing formula, Rnf and Rng may be the same or different and each represents a hydrogen atom, an alkyl group, a substituted alkyl group, a halogen atom, a hydroxyl group, or an alkoxy group. As the alkyl group, lower alkyl groups such as a methyl group, an ethyl group, a propyl group, an isopropyl group, and a butyl group are preferable. More preferably, the alkyl group is selected from a methyl group, an ethyl group, a propyl group, and an isopropyl group. Examples of substituents of the substituted alkyl group include a hydroxyl group, a halogen atom, and an alkoxy group. Examples of the alkoxy group include ones having from 1 to 4 carbon atoms such as a methoxy group, an ethoxy group, a propoxy group, and a butoxy group. Examples of the halogen atom include a chlorine atom, a bromine atom, a fluorine atom, and an iodine atom. r represents an integer of from 1 to 10.

In the formula (VI), as the cycloalkylene group represented by $A_6$, ones having from 3 to 10 carbon atoms are enumerated, and examples include a cyclopentylene group, a cyclohexylene group, and a cyclooctylene group.

The bridged alicyclic ring containing $Z_6$ may have a substituent. Examples of the substituent include a halogen atom, an alkoxy group (preferably one having from 1 to 4 carbon atoms), an alkoxycarbonyl group (preferably one having from 1 to 5 carbon atoms), an acyl group (such as a formyl group and a benzoyl group), an acyloxy group (such as a propylcarbonyloxy group and a benzoyloxy group), an alkyl group (preferably one having from 1 to 4 carbon atoms), a carboxyl group, a hydroxyl group, and an alkylsulfonyl-sulfamoyl group (such as —$CONHSO_2CH_3$). Incidentally, the alkyl group as the substituent may be further substituted with a hydroxyl group, a halogen atom, an alkoxy group (preferably one having from 1 to 4 carbon atoms), and the like.

In the formula (VI), the oxygen atom of the ester group bonding to $A_6$ may bond to the carbon atom constituting the bridged alicyclic ring structure containing $Z_6$ at any position.

Specific examples of the repeating unit represented by the formula (VI) will be given below, but is should not be construed that the invention is limited thereto.

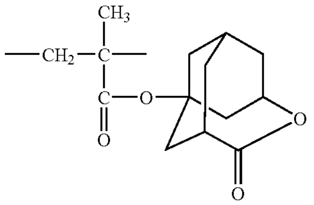

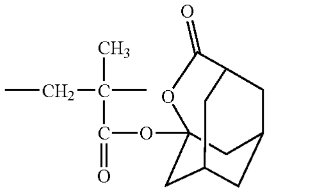

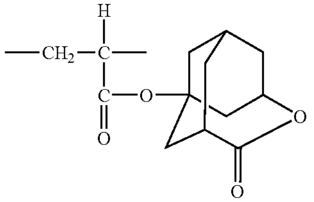

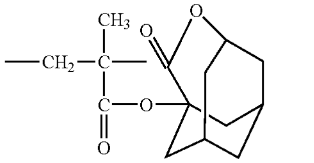

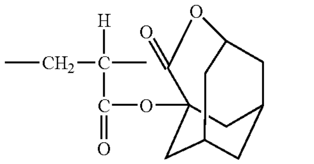

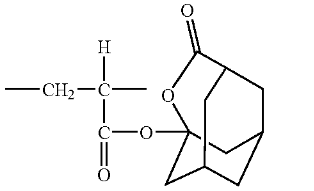

-continued

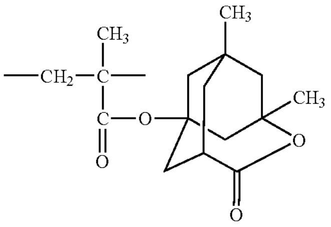

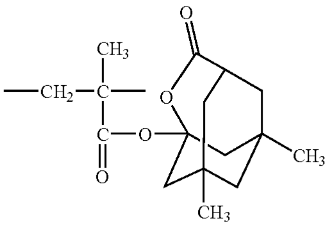

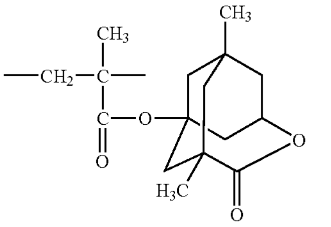

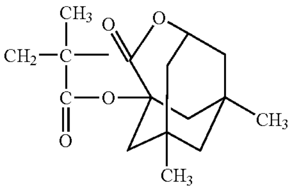

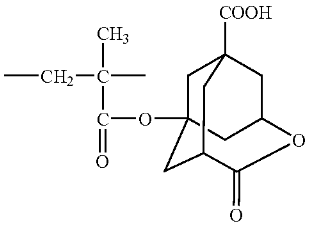

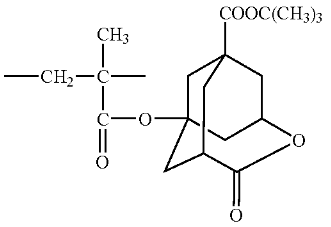

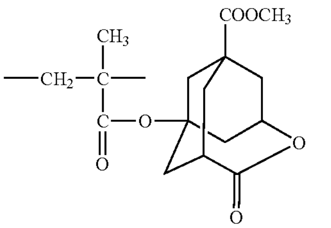

-continued

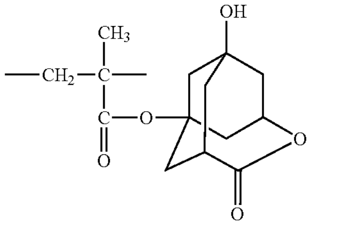

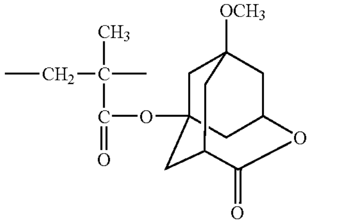

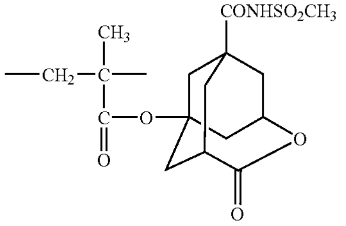

The acid decomposable resin as the component (A) can contain various repeating units for the purposes of adjusting dry etching resistance, standard developing solution adaptability, substrate adhesion, resist profile, and characteristics generally required for resists, such as resolution, heat resistance, and sensitivity, in addition to the foregoing repeating units.

As such repeating units can be enumerated repeating structural units corresponding to the following monomers, but it should not be construed that the invention is limited thereto.

Thus, it is possible to finely control performances required for the acid decomposable resin, especially the following properties:

(1) solubility in coating solvent, (2) film forming property (glass transition point), (3) alkali developability, (4) film diminishment (hydrophilicity and selection of alkali-soluble group), (5) adhesion to substrate in unexposed areas, and (6) dry etching resistance.

Examples of such monomers include compounds having at least one addition polymerizable unsaturated bond selected from acrylic acid esters, methacrylic acid esters, acrylamides, methacrylamides, allyl compounds, vinyl ethers, and vinyl esters.

Specifically, the following monomers can be enumerated.

Acrylic acid esters (preferably alkyl acrylates in which the alkyl group has from 1 to 10 carbon atoms):

Methyl acrylate, ethyl acrylate, propyl acrylate, amyl acrylate, cyclohexyl acrylate, ethylhexyl acrylate, octyl acrylate, t-octyl acrylate, chloroethyl acrylate, 2-hydroxyethyl acrylate, 2,2-dimethylhydroxypropyl acrylate, 5-hydroxypentyl acrylate, trimethylolpropane monoacrylate, pentaerythritol monoacrylate, benzyl acrylate, methoxybenzyl acrylate, furfuryl acrylate, tetrahydrofurfuryl acrylate, etc.

Methacrylic acid esters (preferably alkyl methacrylates in which the alkyl group has from 1 to 10 carbon atoms):

Methyl methacrylate, ethyl methacrylate, propyl methacrylate, isopropyl methacrylate, amyl methacrylate, hexyl methacrylate, cyclohexyl methacrylate, benzyl methacrylate, chlorobenzyl methacrylate, octyl methacrylate, 2-hydroxyethyl methacrylate, 4-hydroxybutyl methacrylate, 5-hydroxypentyl methacrylate, 2,2-dimethyl-3-hydroxypropyl methacrylate, trimethylolpropane monomethacrylate, pentaerythritol monomethacrylate, furfuryl methacrylate, tetrahydrofurfuryl methacrylate, etc.

Acrylamides:

Acrylamide, N-alkylacrylamides (ones in which the alkyl group having from 1 to 10 carbon atoms such as a methyl group, an ethyl group, a propyl group, a butyl group, a t-butyl group, a heptyl group, an octyl group, a cyclohexyl group, and a hydroxyethyl group), N,N-dialkylacrylamides (ones in which the alkyl group having from 1 to 10 carbon atoms such as a methyl group, an ethyl group, a butyl group, an isobutyl group, an ethylhexyl group, and a cyclohexyl group), N-hydroxyethyl-N-methylacrylamide, N-2-acetamidoethyl-N-acetylacrylamide, etc.

Methacrylamides:

Methacrylamide, N-alkylmethacrylamides (ones in which the alkyl group having from 1 to 10 carbon atoms such as a methyl group, an ethyl group, a t-butyl group, an ethylhexyl group, a hydroxyethyl group, and a cyclohexyl group), N,N-dialkylmethacrylamides (examples of the alkyl group include an ethyl group, a propyl group, and a butyl group), N-hydroxyethyl-N-methylmethacrylamide, etc.

Allyl compounds:

Allyl esters (such as allyl acetate, allyl caproate, allyl caprylate, allyl laurate, allyl palmitate, allyl stearate, allyl benzoate, allyl acetoacetate, and allyl lactate), allyloxy ethanol, etc.

Vinyl ethers:

Alkyl vinyl ethers (such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydrofurfuryl vinyl ether, etc.

Vinyl esters:

Vinyl butyrate, vinyl isobutyrate, vinyl trimethyl acetate, vinyl diethyl acetate, vinyl valerate, vinyl caproate, vinyl chloroacetate, vinyl dichloroacetate, vinyl methoxyacetate, vinyl butoxyacetate, vinyl acetoactate, vinyl lactate, vinyl β-phenylburyrate, vinyl cyclohexylcarboxylate, etc.

Dialkyl itaconates:

Dimethyl itaconate, diethyl itaconate, dibutyl itaconate, etc.

Dialkyl esters or monoalkyl esters of fumaric acid:

Dibutyl fumarate, etc.

Besides, crotonic acid, itaconic acid, maleic anhydride, maleimide, acrylonitrile, methacrylonitrile, maleylonitrile, etc.

Besides, addition polymerizable unsaturated compounds that are copolymerizable with monomers corresponding the foregoing various repeating units may be copolymerized.

In the acid decomposable resin, the molar ratio of the respective repeating units to be contained is properly set up for the sake of adjusting dry etching resistance and standard developing solution adaptability of resist, substrate adhesion, resist profile, and characteristics generally required for resists, such as resolution, heat resistance, and sensitivity.

In the acid decomposable resin, the content of the repeating unit having a partial structure containing an alicyclic hydrocarbon represented by any one of the formulae (pI) to (pVI) is preferably from 30 to 70 mol %, more preferably from 35 to 65 mol %, and further preferably from 40 to 60 mol % based on the whole of the repeating units.

Also, the content of the repeating units based on the monomers of the foregoing additional copolymerization component in the resin can be properly set up according to the desired performance of the resist but is generally not more than 99 mol %, more preferably not more than 90 mol %, and further preferably not more than 80 mol % based on the molar number of the repeating unit having a partial structure containing an alicyclic hydrocarbon represented by any one of the formulae (pI) to (pVI).

When the composition of the invention is used for ArF exposure, aromatic group-free resins are preferred from the viewpoint of transparency to ArF rays.

In the acid decomposable resin, the content of the repeating unit having an acid decomposable group is preferably from 15 to 50 mol %, and more preferably from 20 to 40 mol % based on the whole of the repeating units.

The acid decomposable resin (A) that is used in the invention can be synthesized according to customary methods (such as radical polymerization). Examples of general synthesis methods include a method in which a monomer seed is charged in a reaction vessel collectively or on the way of reaction and optionally dissolved in a reaction solvent such as an ether (such as tetrahydrofuran, 1,4-dioxane, and diisopropyl ether), a ketone (such as methyl ethyl ketone and methyl isobutyl ketone), an ester solvent (such as ethyl acetate), and a solvent capable of dissolving the composition of the invention therein as described later (such as propylene glycol monomethyl ether acetate) to prepare a uniform solution, which is then started for polymerization using a commercially available radical initiator (such as azo based initiators and peroxides) in an inert gas atmosphere (such as nitrogen and argon) optionally under heating. If desired, the initiator is supplemented or added dividedly, and after completion of the reaction, the reaction mixture is added to a solvent to recover a desired polymer by powder or solid recovery.

The reaction concentration is 20% by weight or more, preferably 30% by weight or more, and more preferably 40% by weight or more. The reaction temperature is from 10° C. to 150° C., preferably from 30° C. to 120° C., and more preferably from 50° C. to 100° C.

The respective repeating structural units represented by the foregoing specific examples may be used singly or in admixture.

Also, in the invention, the resin (A) may be used singly or in combination.

The resin (A) according to the invention preferably has a weight average molecular weight, as reduced into polystyrene by the GPC method, of from 1,000 to 200,000, and more preferably from 3,000 to 20,000. When the weight average molecular weight is less than 1,000, heat resistance and dry etching resistance are deteriorated, and therefore, such is not so preferable. On the other hand, when it exceeds 200,000, developability is deteriorated, or viscosity becomes extremely high, leading to not so desirable results such as deterioration of film forming property.

Resins having a molecular weight distribution in the range of from 1 to 10, preferably from 1 to 5, and more preferably from 1 to 4 are used. When the molecular weight distribution is small, resolution and resist shape are excellent, the side walls of a resist pattern is smooth, and roughness performance is excellent.

In the positive type resist composition of the invention, the compounding amount of all of the resins according to the invention in the whole of the composition is preferably from 40 to 99.99% by weight, and more preferably from 50 to 99.97% by weight based on the total resist solids content.

[2] (B) Compound Capable of Generating an Acid Upon Irradiation with an Actinic Ray or a Radiation:

The composition of the invention contains a compound capable of generating an acid upon irradiation with an actinic ray or a radiation (photo acid generator) as the component (B).

As such photo acid generators, can be properly selected and used photo initiators of photo cationic polymerization, photo initiators of photo radical polymerization, photo color fading agents of pigments, photo discoloring agents, known compounds capable of generating an acid upon irradiation with an actinic ray or a radiation, which are used in micro resists, and mixtures thereof.

Examples include onium salts (such as diazonium salts, ammonium salts, phosphonium salts, iodonium slats, sulfonium salts, selenonium salts, and arsonium salts), organic halogen compounds, organic metal/organic halides, photo acid generators having an o-nitrobenzyl type protective group, compounds that cause photo decomposition to generate sulfonic acid, represented by iminosulfonate, and disulfone compounds.

Also, compounds in which a group or a compound capable of generating an acid upon irradiation with an actinic ray or a radiation is introduced into a main chain or side chains of the polymer, such as compounds as described in U.S. Pat. No. 3,849,137, German Patent No. 3,914,407, JP-A-63-26653, JP-A-55-164824, JP-A-62-69263, JP-A-63-146038, JP-A-63-163452, JP-A-62-153853, and JP-A-63-146029, can be used.

Moreover, compounds capable of generating an acid by light, as described in U.S. Pat. No. 3,779,778 and European Patent No. 126,712, can be used.

Among the foregoing compounds capable of generating an acid upon irradiation with an actinic ray or a radiation, ones that are effectively used will be described below.

(1) Iodonium Salts Represented by the Following Formula (PAG1) or Sulfonium Salts Represented by the Following Formula (PAG2):

(PAG1)

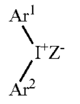

(PAG2)

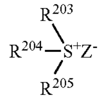

Here, $Ar^1$ and $Ar^2$ each independently represents a substituted or unsubstituted aryl group. Preferred examples of substituents include an alkyl group, a haloalkyl group, a cycloalkyl group, an aryl group, an alkoxy group, a nitro group, a carboxyl group, an alkoxycarbonyl group, a hydroxyl group, a mercapto group, and a halogen atom.

$R^{203}$, $R^{204}$, and $R^{205}$ each independently represents a substituted or unsubstituted alkyl group or aryl group.

Above all, aryl groups having from 6 to 14 carbon atoms, alkyl groups having from 1 to 8 carbon atoms, and substituted derivatives thereof are preferable.

Preferred examples of substituents include an alkoxy group having from 1 to 8 carbon atoms, an alkyl group having from 1 to 8 carbon atoms, a nitro group, a carboxyl group, a hydroxyl group, and a halogen atom for the aryl group; and an alkoxy group having from 1 to 8 carbon atoms, a carboxyl group, and an alkoxycarbonyl group for the alkyl group, respectively.

$Z^-$ represents a counter anion, and examples include perfluoroalkanesulfonic acid anions (such as $BF_4^-$, $AsF_6^-$, $PF_6^-$, $SbF_6^-$, $SiF_6^-$, $ClO_4^-$, and $CF_3SO_3^-$), a pentafluorobenzenesulfonic acid anion; fused polynuclear aromatic sulfonic acid anions (such as a naphthalene-1-sulfonic acid anion), an anthraquinonesulfonic acid anion, and sulfonic acid group-containing dyes. However, it should not be construed that the invention is limited thereto.

Also, two of $R^{203}$, $R^{204}$, and $R^{205}$, and $Ar^1$ and $Ar^2$ may be respectively bonded to each other via a single bond or a substituent.

Specific examples include compounds described blow, but it should not be construed that the invention is limited thereto.

(PAG1-1)

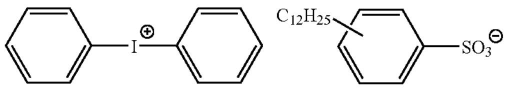

(PAG1-2)

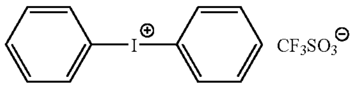

(PAG1-3)

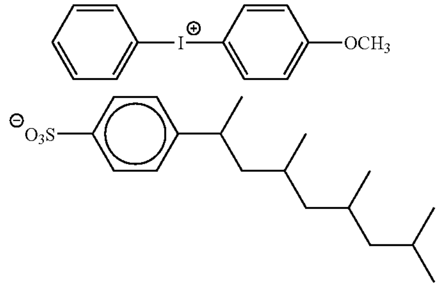

(PAG1-4)

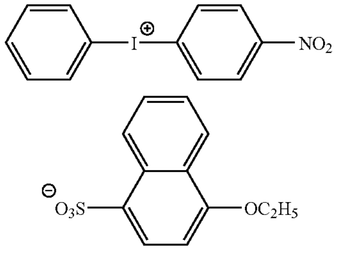

-continued (PAG1-5)

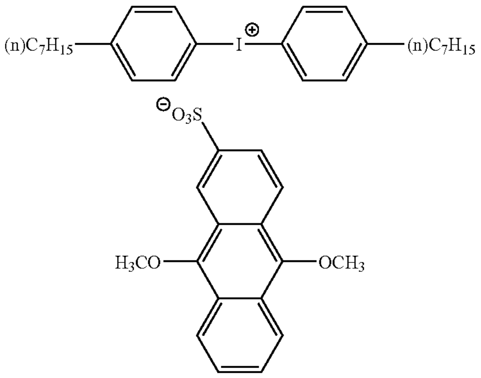

(PAG1-6)

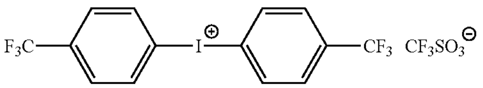

(PAG1-7)

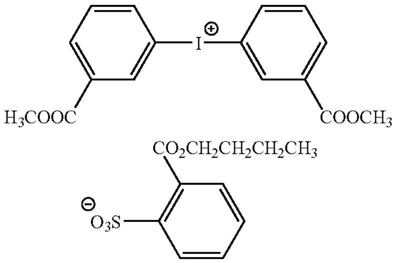

(PAG1-8)

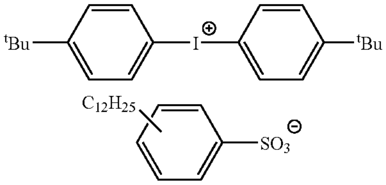

(PAG1-9)

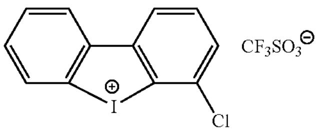

(PAG1-10)

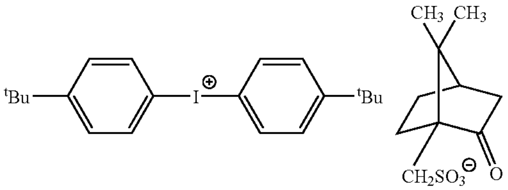

-continued
(PAG1-11)
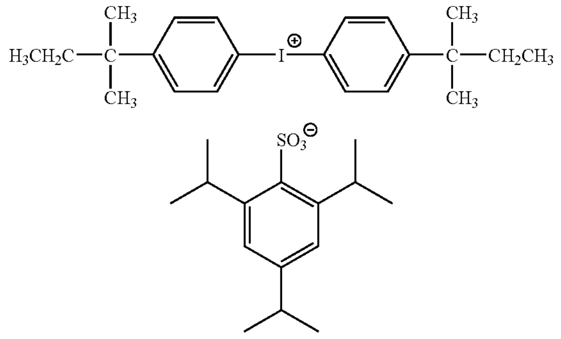
(PAG1-12)
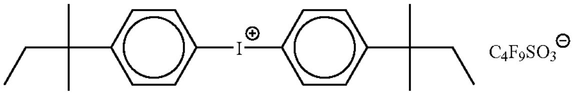
(PAG1-13)
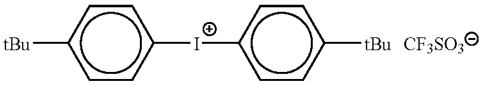
(PAG1-14)
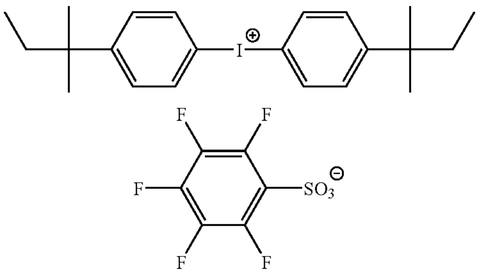
(PAG2-1)
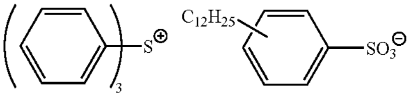
(PAG2-2)
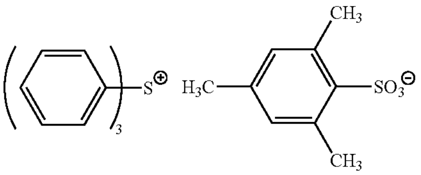
(PAG2-3)
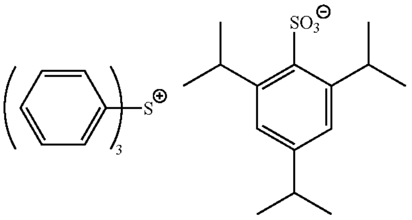
(PAG2-4)
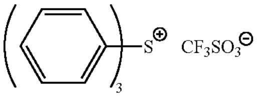
-continued
(PAG2-5)
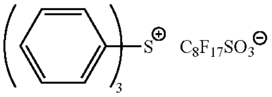
(PAG2-6)
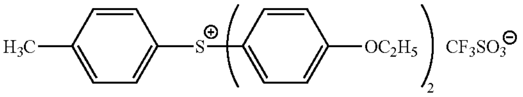
(PAG2-7)
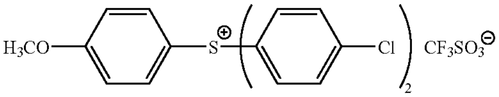
(PAG2-8)
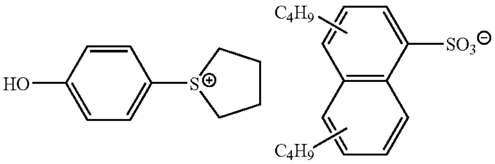
(PAG2-9)
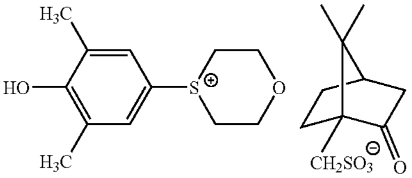
(PAG-2-10)
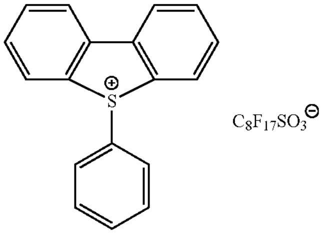
(PAG2-11)
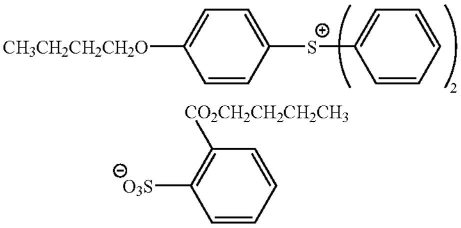
(PAG2-12)
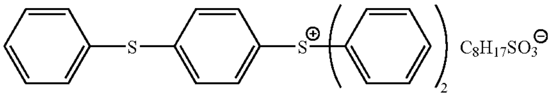
(PAG2-13)
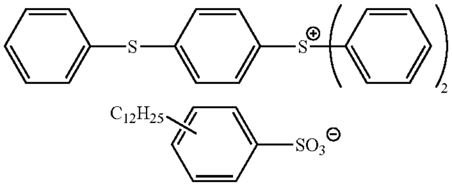

-continued (PAG2-14)

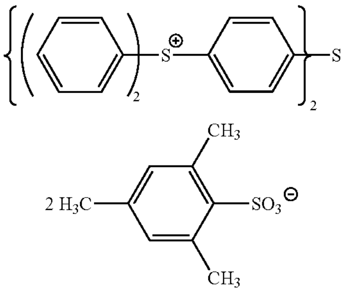

(PAG2-15)

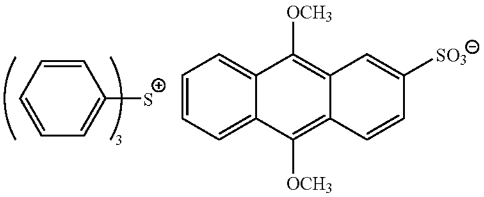

(PAG2-16)

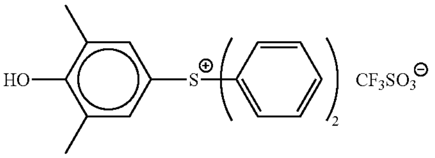

(PAG2-17)

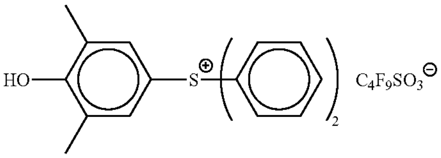

(PAG2-18)

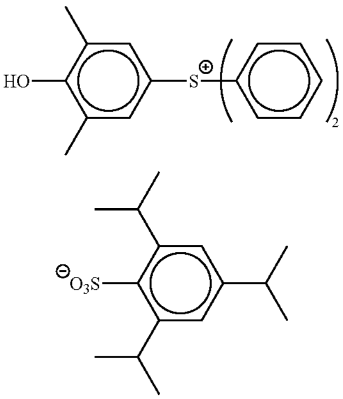

(PAG2-19)

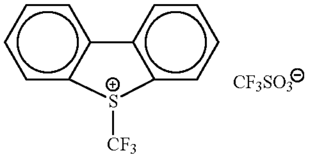

-continued (PAG2-20)

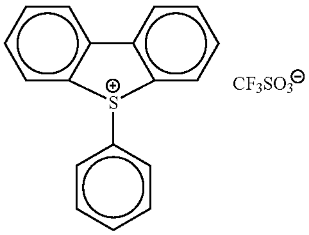

(PAG2-21)

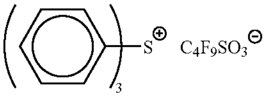

(PAG2-22)

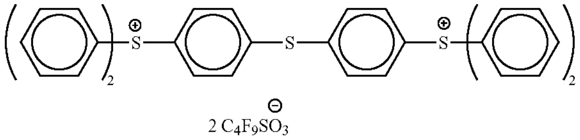

(PAG2-23)

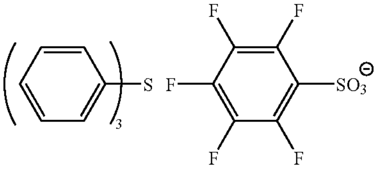

(PAG2-24)

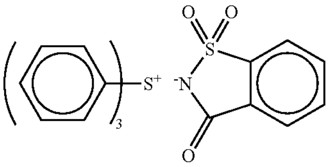

(PAG2-25)

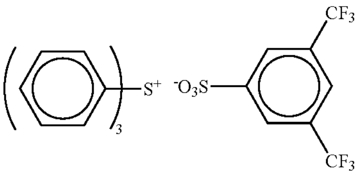

The foregoing onium salts represented by the formulae (PAG1) and (PAG2) can be synthesized by methods described in, for example, U.S. Pat. Nos. 2,807,648 and 4,247,473 and JP-A-53-101331.

(2) Disulfone Derivatives Represented by the Following Formula (PAG3) or Iminosulfonate Derivatives Represented by the Following Formula (PAG4):

(PAG3)

$$Ar^3—SO_2—SO_2—Ar^4$$

(PAG4)

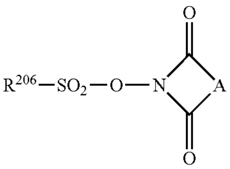

In the formulae, $Ar^3$ and $Ar^4$ each independently represents a substituted or unsubstituted aryl group.

$R^{206}$ represents a substituted or unsubstituted alkyl group or aryl group. A represents a substituted or unsubstituted alkylene group, alkenylene group or arylene group.

Specific examples include compounds described blow, but it should not be construed that the invention is limited thereto.

(PAG3-1)

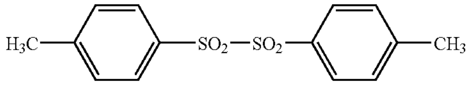

(PAG3-2)

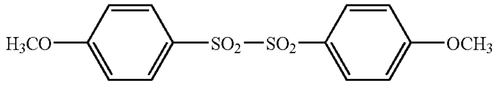

(PAG3-3)

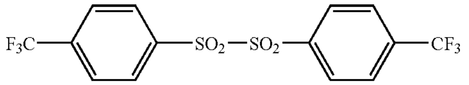

(PAG3-4)

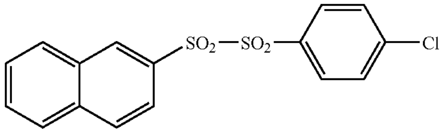

(PAG3-5)

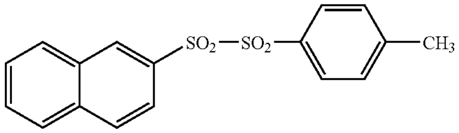

(PAG3-6)

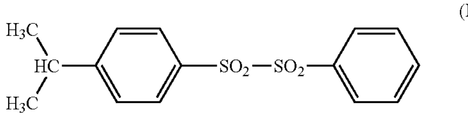

(PAG3-7)

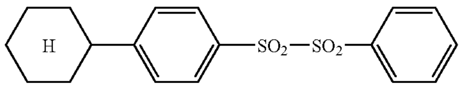

(PAG4-1)

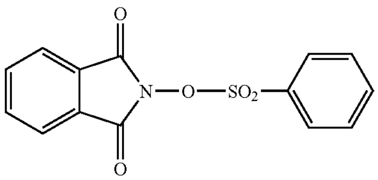

(PAG4-2)

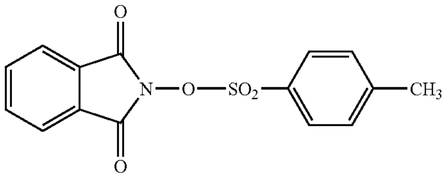

-continued (PAG4-3)

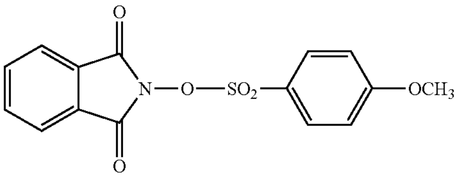

(PAG4-4)

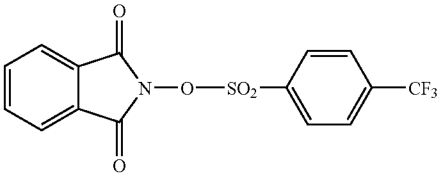

(PAG4-5)

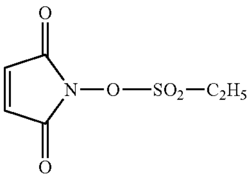

(PAG4-6)

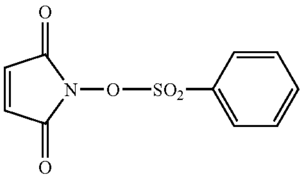

(PAG4-7)

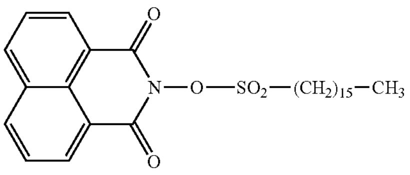

(3) Diazodisulfone Derivatives Represented by the Following Formula (PAG5):

(PAG5)

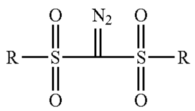

Here, R represents a linear, branched or cyclic alkyl group or an optionally substituted aryl group.

Specific examples include compounds described blow, but it should not be construed that the invention is limited thereto.

(PAG5-1)

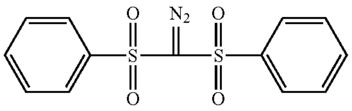

-continued (PAG5-2)

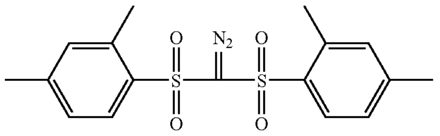

(PAG5-3)

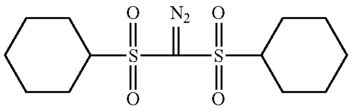

(PAG5-4)

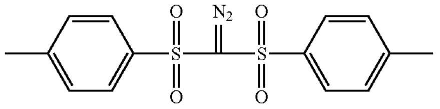

(PAG5-5)

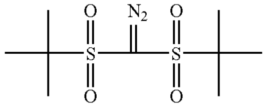

Also, in addition to the foregoing compounds, compounds represented by the following formula (PAG6) can be effectively used as the acid generator of the component (A) of the invention.

(PAG6)

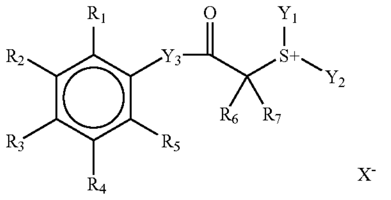

In the formula (PGA6), $R_1$ to $R_5$ each represents a hydrogen atom, an alkyl group, an alkoxy group, a nitro group, a halogen atom, an alkyloxycarbonyl group, or an aryl group, and at least two of $R_1$ to $R_5$ may be bonded to each other to form a ring structure.

$R_6$ and $R_7$ each represents a hydrogen atom, an alkyl group, a cyano group, or an aryl group.

$Y_1$ and $Y_2$ each represents an alkyl group, an aryl group, an aralkyl group, or a hetero atom-containing aromatic group, and $Y_1$ and $Y_2$ may be bonded to each other to form a ring.

$Y_3$ represents a single bond or a divalent connecting group.

$X^-$ represents a non-nucleophilic anion.

At least one of $R_1$ to $R_5$ and at least one of $Y_1$ and $Y_2$ may be bonded to each other to form a ring, or at least one of $R_1$ to $R_5$ and at least one of $R_6$ and $R_7$ may be bonded to each other to form a ring.

Two or more of the structures of the formula (PAG6) may be bonded to each other via a connecting group at any one of the positions of $R_1$ to $R_7$ or $Y_1$ and $Y_2$.

The alkyl group represented by $R_1$ to $R_7$ is a substituted or unsubstituted alkyl group, and preferably an alkyl group having from 1 to 5 carbon atoms. Examples of the unsubstituted alkyl group include a methyl group, an ethyl group, a propyl group, an n-butyl group, a sec-butyl group, and a t-butyl group.

The alkoxy group and the alkoxy group in the alkyloxycarbonyl group represented by $R_1$ to $R_5$ is a substituted or unsubstituted alkoxy group, and preferably an alkoxy group having from 1 to 5 carbon atoms. Examples of the unsubstituted alkoxy group include a methoxy group, an ethoxy group, a propoxy group, and a butoxy group.

The aryl group represented by $R_1$ to $R_7$, $Y_1$, and $Y_2$ is a substituted or unsubstituted aryl group, and preferably an aryl group having from 6 to 14 carbon atoms. Examples of the unsubstituted aryl group include a phenyl group, a tolyl group, and a naphthyl group.

Examples of the halogen atom represented by $R_1$ to $R_5$ include a fluorine atom, a chlorine atom, a bromine atom, and an iodine atom.

The alkyl group represented by $Y_1$ and $Y_2$ is a substituted or unsubstituted alkyl group, and preferably an alkyl group having from 1 to 30 carbon atoms. Examples of the unsubstituted alkyl group include a linear or branched alkyl group such as a methyl group, an ethyl group, a propyl group, an n-butyl group, a sec-butyl group, and a t-butyl group; and a cyclic alkyl group such as a cyclopropyl group, a cyclopentyl group, a cyclohexyl group, an adamantyl group, a norbornyl group, and a boronyl group.

The aralkyl group represented by $Y_1$ and $Y_2$ is a substituted or unsubstituted aralkyl group, and preferably an aralkyl group having from 7 to 12 carbon atoms. Examples of the unsubstituted aralkyl group include a benzyl group, a phenethyl group, and a cumyl group.

The hetero atom-containing aromatic group as referred to herein represents a group in which an aromatic group such as an aryl group having from 6 to 14 carbon atoms has a hetero atom such as a nitrogen atom, an oxygen atom, and a sulfur atom.

The hetero atom-containing aromatic group represented by $Y_1$ and $Y_2$ is a substituted or unsubstituted, hetero atom-containing aromatic group. Examples of the unsubstituted, hetero atom-containing aromatic group include heterocyclic aromatic hydrocarbon groups such as furan, thiophene, pyrrole, pyridine, and indole.

$Y_1$ and $Y_2$ may be bonded to each other to form a ring along with $S^+$ in the formula (PAG6).

In this case, examples of the ring formed by $Y_1$ and $Y_2$ include an alkylene group having from 4 to 10 carbon atoms, preferably a butylene group, a pentylene group, and a hexylene group, and particularly preferably a butylene group and a pentylene group.

Also, the ring formed by $Y_1$ and $Y_2$ along with $S^+$ in the formula (PAG6) may contain a hetero atom.

Each of the foregoing alkyl group, alkoxy group, alkyloxycarbonyl group, aryl group and aralkyl group may be substituted with, for example, a nitro group, a halogen atom, a carboxyl group, a hydroxyl group, an amino group, a cyano group, or an alkoxy group (preferably one having from 1 to 5 carbon atoms). Further, each of the aryl group and the aralkyl group may be substituted with an alkyl group (preferably one having from 1 to 5 carbon atoms).

Also, as the substituent of the alkyl group, a halogen atom is preferable.

$Y_3$ represents a single bond or a divalent connecting group. As the divalent connecting group, are preferable an optionally substituted alkylene group or alkenylene group, —O—, —S—, —CO—, —CONR— (R represents hydrogen, an alkyl group, or an acyl group), and a connecting group containing two or more groups thereof.

Examples of the non-nucleophilic anion represented by $X^-$ include a sulfonic acid anion and a carboxylic acid anion.

The non-nucleophilic anion as referred to herein means an anion whose ability to cause nucleophilic reaction is extremely low and capable of suppressing degradation with time due to intramolecular nucleophilic reaction. Thus, stability with time of resist is improved.

Examples of sulfonic acid anions include alkylsulfonic acid anions, arylsulfonic acid anions, and camphorsulfonic acid anions.

Examples of carboxylic acid anions include alkanecarboxylic acid anions, arylcarboxylic acid anions, and aralkylcarboxylic acid anions.

As the alkyl group in the alkylsulfonic acid anion are preferable alkyl groups having from 1 to 30 carbon atoms. Examples include a methyl group, an ethyl group, a propyl group, an isopropyl group, an n-butyl group, an isobutyl group, a sec-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a cyclopropyl group, a cyclopentyl group, a cyclohexyl group, an adamantyl group, a norbornyl group, and a boronyl group.

As the aryl group in the arylsulfonic acid anion are preferable aryl groups having from 6 to 14 carbon atoms. Examples include a phenyl group, a tolyl group, and a naphthyl group.

The alkyl group and aryl group in the foregoing alkylsulfonic acid anion and arylsulfonic acid anion may have a substituent.

Examples of substituents include a halogen atom, an alkyl group, an alkoxy group, and an alkylthio group.

Examples of halogen atoms include a chlorine atom, a bromine atom, a fluorine atom, and an iodine atom.

As the alkyl group are preferable alkyl groups having from 1 to 20 carbon atoms. Examples include a methyl group, an ethyl group, a propyl group, an isopropyl group, an n-butyl group, an isobutyl group, a sec-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

As the alkoxy group are preferable alkoxy groups having from 1 to 5 carbon atoms. Examples include a methoxy group, an ethoxy group, a propoxy group, and a butoxy group.

As the alkylthio group are preferable alkylthio groups having from 1 to 20 carbon atoms. Examples include a methylthio group, an ethylthio group, a propylthio group, an isopropylthio group, an n-butylthio group, an isobutylthio group, a sec-butylthio group, a pentylthio group, a neopentylthio group, a hexylthio group, a heptylthio group, an octylthio group, a nonylthio group, a decylthio group, an undecylthio group, a dodecylthio group, a tridecylthio group, a tetradecylthio group, a pentadecylthio group, a hexadecylthio group, a heptadecylthio group, an octadecylthio group, a nonadecylthio group, and an eicosylthio group. Incidentally, the alkyl group, alkoxy group and alkylthio group may further be substituted with a halogen atom (preferably a fluorine atom).

As the alkyl group in the alkylcarboxylic acid anion, can be enumerated ones the same as in the alkyl group in the alkylsulfonic acid anion.

As the aryl group in the arylcarboxylic acid anion, can be enumerated ones the same as in the aryl group in the arylsulfonic acid anion.

As the aralkyl group in the aralkylcarboxylic acid anion are preferable aralkyl groups having from 6 to 12 carbon atoms. Examples include a benzyl group, a phenethyl group, a naphthylmethyl group, a naphthylethyl group, and a naphthylmethyl group.

The alkyl group, aryl group and aralkyl group in the foregoing alkylcarboxylic acid anion, arylcarboxylic acid anion and aralkylcarboxylic acid anion may have a substituent. Examples of substituents include ones the same as in arylsulfonic acid anion, such as a halogen atom, an alkyl group, an alkoxy group, and an alkylthio group.

Other examples of non-nucleophilic anions include fluorinated phosphorus, fluorinated boron, and fluorinated antimony.

In the compound represented by the formula (PAG6) of the invention, at least one of $R_1$ to $R_5$ and at least one of $Y_1$ and $Y_2$ may be bonded to each other to form a ring, or at least one of $R_1$ to $R_5$ and at least one of $R_6$ and $R_7$ may be bonded to each other to form a ring. In the compound represented by the formula (PAG6), when a ring is formed, the stereostructure is fixed, and the photodecomposition ability is improved.

Also, two or more of the structures of the formula (PAG6) may be bonded to each other via a connecting group at any one of the positions of $R_1$ to $R_7$ or $Y_1$ and $Y_2$.

Specific examples of the compound represented by the foregoing formula (PAG6) will be given below, but is should not be construed that the invention is limited thereto.

(PAG6A-1)

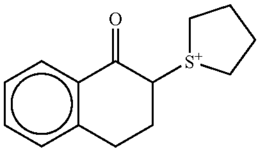

$C_4F_9SO_3^-$ (PAG6A-2)

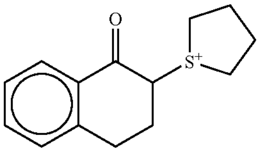

$CF_3SO_3^-$ (PAG6A-3)

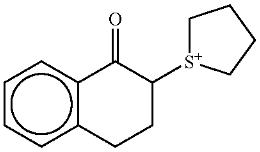

$C_8F_{17}SO_3^-$ (PAG6A-4)

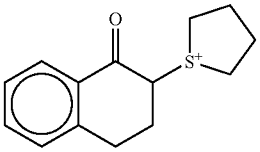

$C_2F_5—O—C_2F_4SO_3^-$ (PAG6A-5)

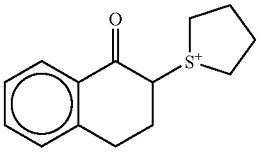

$CF_3CHFCF_2SO_3^-$

-continued
(PAG6A-7)
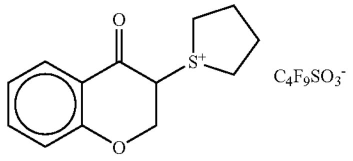
(PAG6A-10)
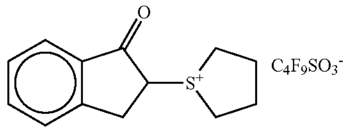
(PAG6A-13)
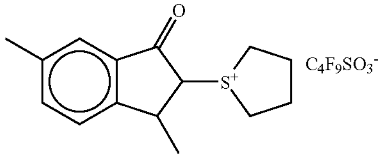
(PAG6A-17)
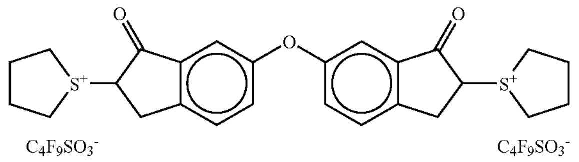
(PAG6A-22)
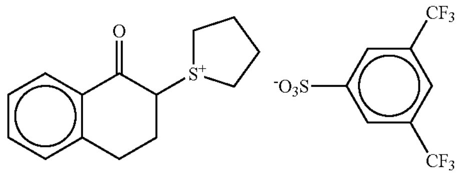
(PAG6A-23)
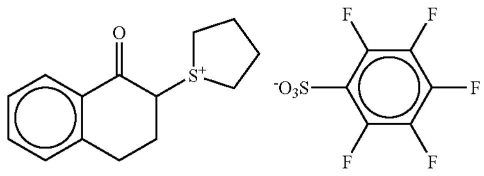
(PAG6A-28)
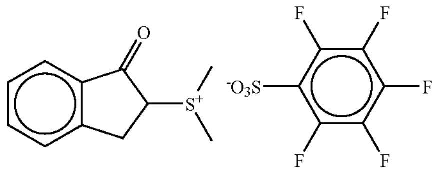
(PAG6A-34)
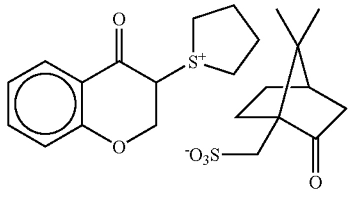
-continued
(PAG6B-1)
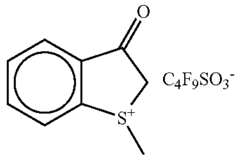
(PAB6B-2)
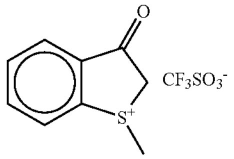
(PAG6B-3)
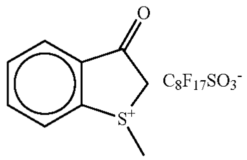
(PAG6B-4)
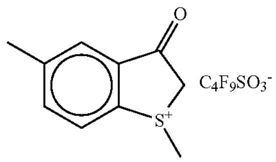
(PAG6B-6)
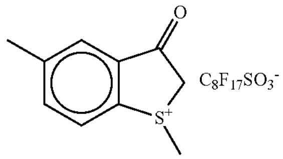
(PAG6B-10)
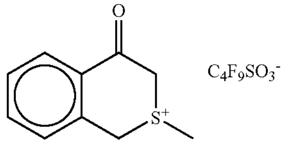
(PAG6B-14)
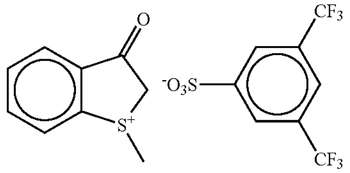
I-1
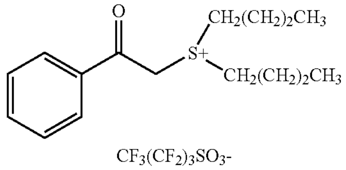
I-2
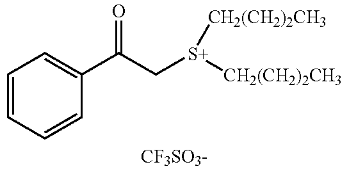

-continued
I-3
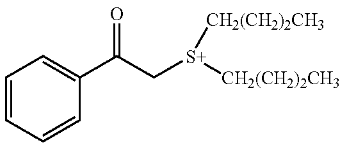
$CF_3(CF_2)_7SO_3$-
I-4
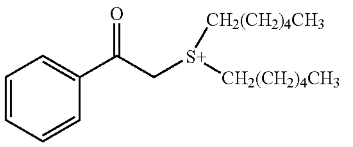
$CF_3(CF_2)_3SO_3$-
I-5
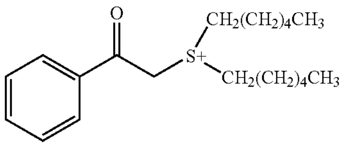
$CF_3SO_3$-
I-6
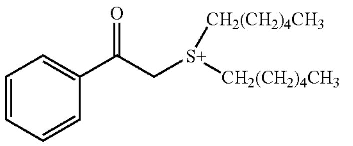
$CF_3(CF_2)_7SO_3$-
I-7
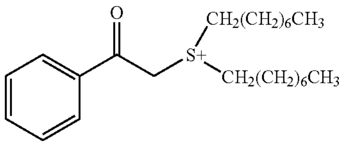
$CF_3(CF_2)_3SO_3$-
I-8
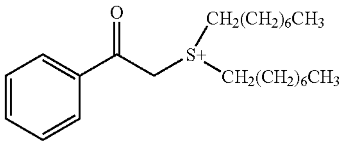
$CF_3SO_3$-
I-9
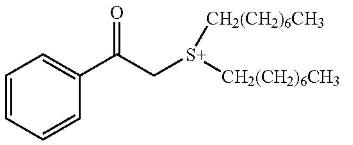
$CF_3(CF_2)_7SO_3$-
I-10
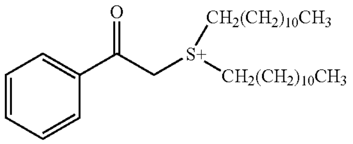
$CF_3(CF_2)_3SO_3$-
-continued
I-11
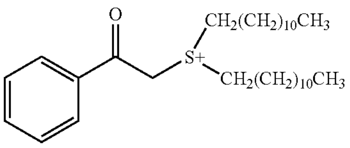
$CF_3SO_3$-
I-12
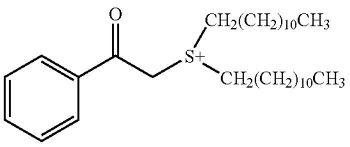
$CF_3(CF_2)_7SO_3$-
I-13
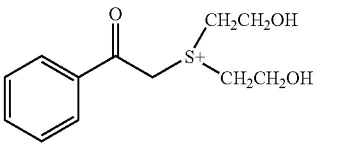
$CF_3(CF_2)_3SO_3$-
I-14
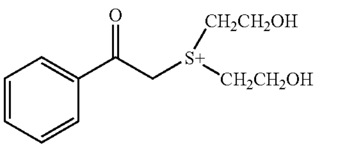
$CF_3SO_3$-
I-15
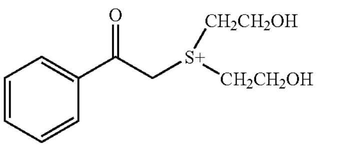
$CF_3(CF_2)_7SO_3$-
I-16
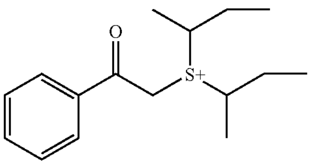
$CF_3(CF_2)_3SO_3$-
I-17
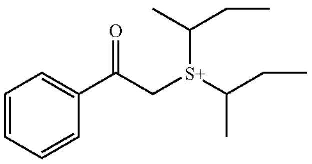
$CF_3SO_3$-
I-18
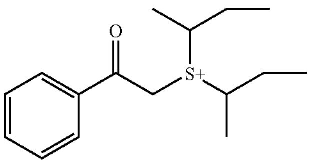
$CF_3(CF_2)_7SO_3$-

-continued
I-19
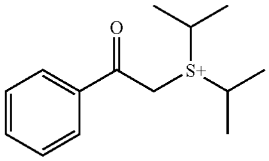
$CF_3(CF_2)_3SO_3$-
I-20
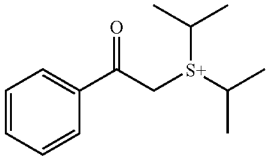
$CF_3SO_3$-
I-21
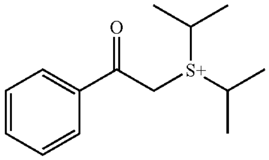
$CF_3(CF_2)_7SO_3$-
I-22
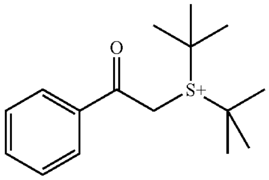
$CF_3(CF_2)_3SO_3$-
I-23
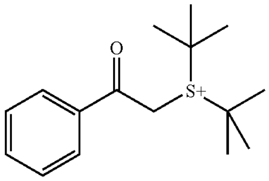
$CF_3SO_3$-
I-24
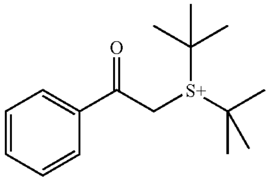
$CF_3(CF_2)_7SO_3$-
I-25
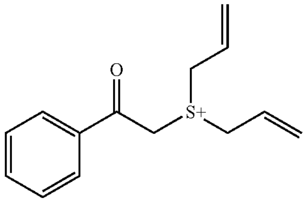
$CF_3(CF_2)_3SO_3$-
-continued
I-26
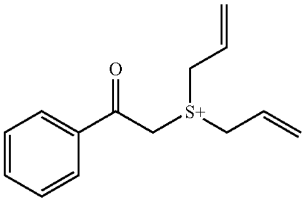
$CF_3SO_3$-
I-27
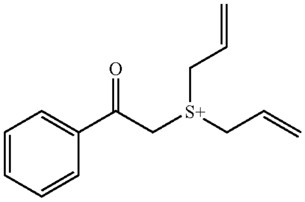
$CF_3(CF_2)_7SO_3$-
I-28
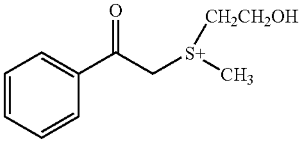
$CF_3(CF_2)_3SO_3$-
I-29
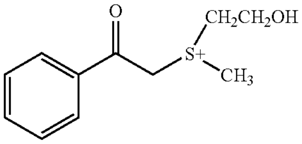
$CF_3SO_3$-
I-30
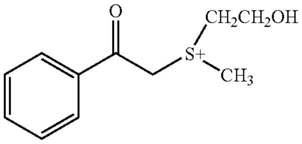
$CF_3(CF_2)_7SO_3$-
I-31
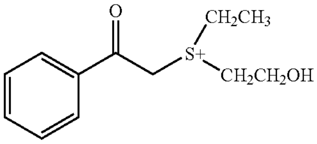
$CF_3(CF_2)_3SO_3$-
I-32
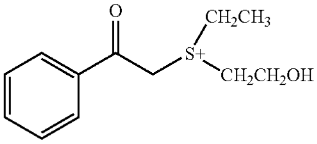
$CF_3SO_3$-
I-33
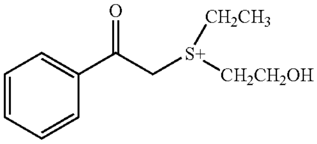
$CF_3(CF_2)_7SO_3$-

-continued
I-34
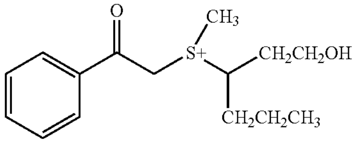
$CF_3(CF_2)_3SO_3$-
I-35
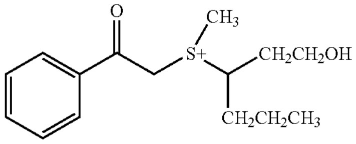
$CF_3SO_3$-
I-36
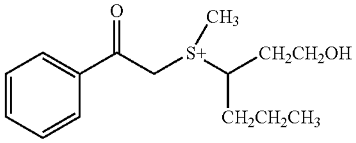
$CF_3(CF_2)_7SO_3$-
I-37
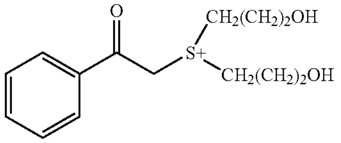
$CF_3(CF_2)_3SO_3$-
I-38
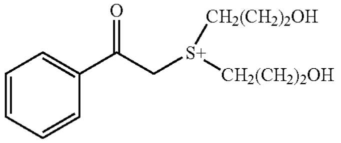
$CF_3SO_3$-
I-39
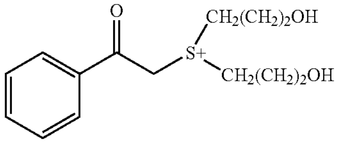
$CF_3(CF_2)_7SO_3$-
I-40
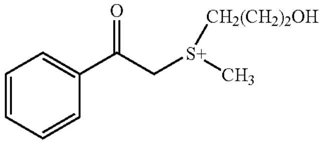
$CF_3(CF_2)_3SO_3$-
I-41
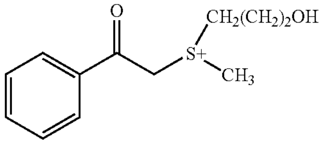
$CF_3SO_3$-
-continued
I-42
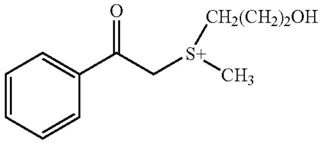
$CF_3(CF_2)_7SO_3$-
I-43
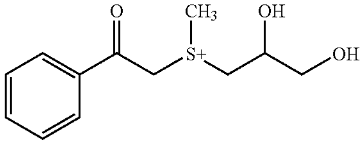
$CF_3(CF_2)_3SO_3$-
I-44
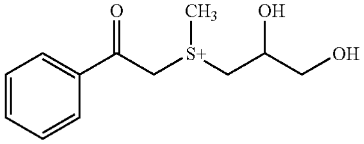
$CF_3SO_3$-
I-45
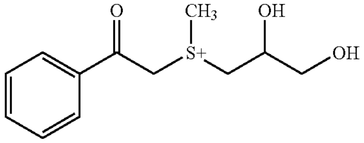
$CF_3(CF_2)_7SO_3$-
I-46
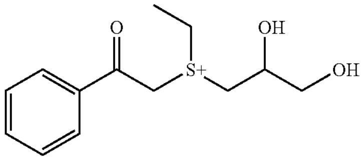
$CF_3(CF_2)_3SO_3$-
I-47
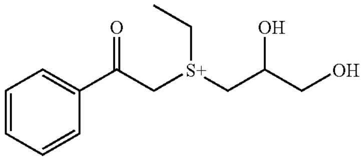
$CF_3SO_3$-
I-48
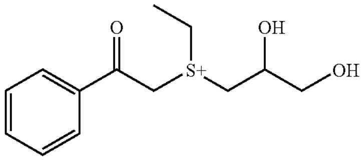
$CF_3(CF_2)_7SO_3$-
I-49
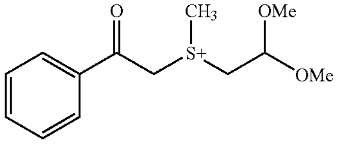
$CF_3(CF_2)_3SO_3$-

-continued
I-50
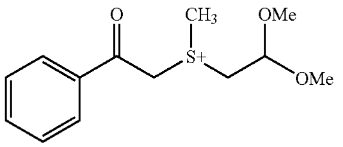
$CF_3SO_3$-
I-51
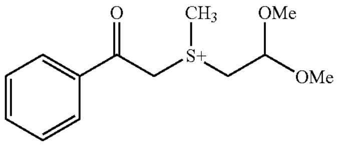
$CF_3(CF_2)_7SO_3$-
I-52
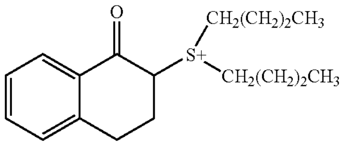
$CF_3(CF_2)_3SO_3$-
I-53
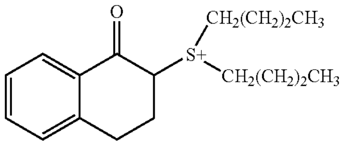
$CF_3SO_3$-
I-54
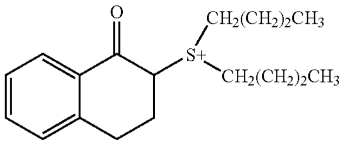
$CF_3(CF_2)_7SO_3$-
I-55
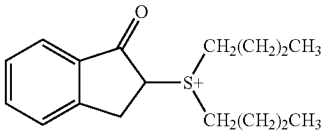
$CF_3(CF_2)_3SO_3$-
I-56
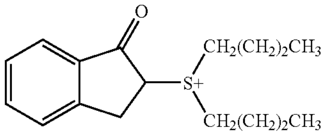
$CF_3SO_3$-
I-57
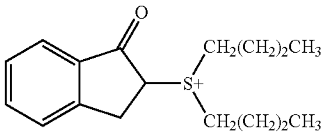
$CF_3(CF_2)_7SO_3$-
I-58
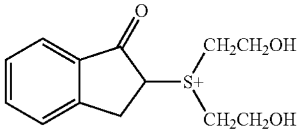
$CF_3(CF_2)_3SO_3$-
-continued
I-59
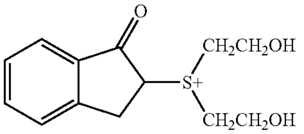
$CF_3SO_3$-
I-60
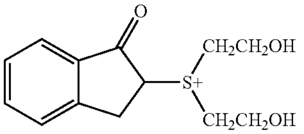
$CF_3(CF_2)_7SO_3$-
I-61
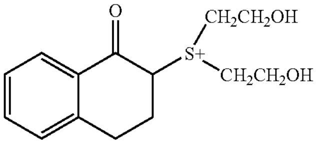
$CF_3(CF_2)_3SO_3$-
I-62
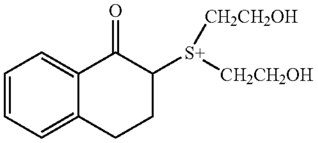
$CF_3SO_3$-
I-63
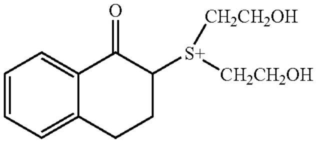
$CF_3(CF_2)_7SO_3$-
I-64
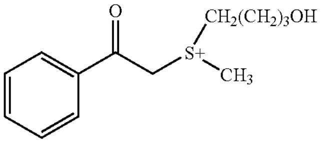
$CF_3(CF_2)_3SO_3$-
I-65
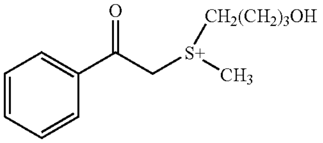
$CF_3SO_3$-
I-66
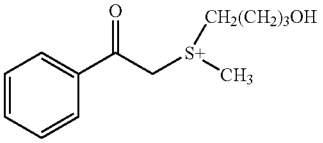
$CF_3(CF_2)_7SO_3$-
I-67
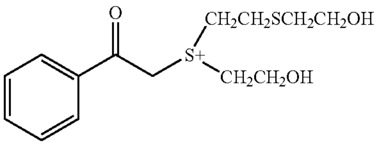
$CF_3(CF_2)_3SO_3$-

-continued

I-68

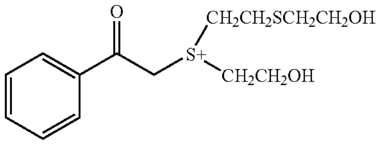

$CF_3SO_3$-

I-69

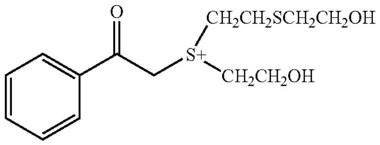

$CF_3(CF_2)_7SO_3$-

I-70

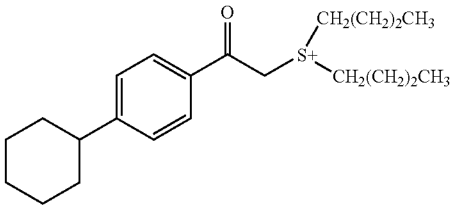

$CF_3(CF_2)_3SO_3$-

I-71

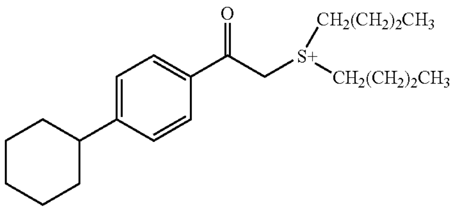

$CF_3SO_3$-

I-72

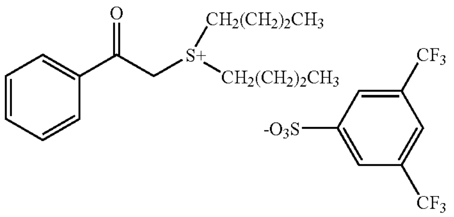

I-73

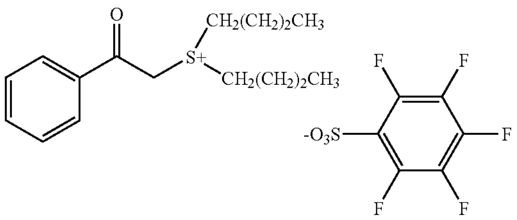

-continued

I-74

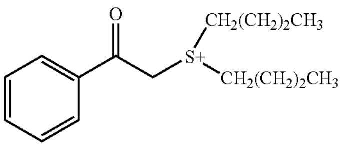

$CF_3CF_2OCF_2CF_2SO_3$-

I-75

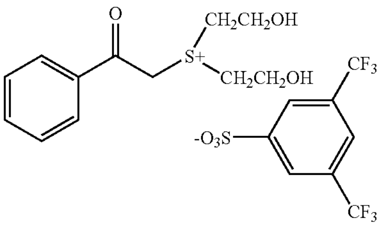

In the invention, it is preferable to jointly use the onium salt compound represented by the foregoing formula (PAG1) or (PAG2) and other non-onium salt compound as the compound (B) capable of generating an acid upon irradiation with an actinic ray or a radiation.

In the invention, it is preferable to jointly use two or more kinds of compounds having a different transmittance against exposure with a wavelength of 193 nm as the compound (B) capable of generating an acid upon irradiation with an actinic ray or a radiation.

In the invention, it is preferable to jointly use two or more kinds of compounds, each of which generates an acid having a different carbon chain length upon irradiation with an actinic ray or a radiation, as the compound (B) capable of generating an acid upon irradiation with an actinic ray or a radiation.

In the invention, it is preferable to jointly use two or more kinds of compounds, each of which generates an acid having a different intensity upon irradiation with an actinic ray or a radiation, as the compound (B) capable of generating an acid upon irradiation with an actinic ray or a radiation.

Among the specific examples of the acid generator represented by the forgoing formula (PAG6), are more preferable (PAG6A-1) to (PAG6A-30) and (PAG6B-1) to (PAG6B-12).

The compound as the component (B) can be used singly or in admixture of two or more thereof.

The content of the compound as the component (B) in the positive type resist composition of the invention is preferably from 0.1 to 20% by weight, more preferably from 0.5 to 20% by weight, and further preferably from 1 to 15% by weight based on the solids content of the composition.

Preferred examples of the compound (B) capable of generating an acid upon irradiation with an actinic ray or a radiation, which is used in the invention, will be given below.

(z1)
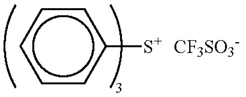
(z2)
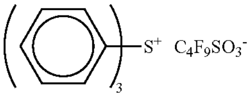
(z3)
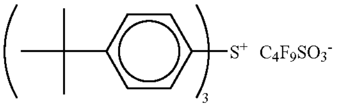
(z4)
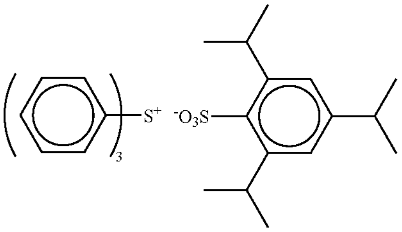
(z5)
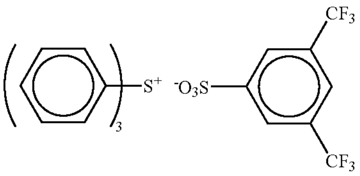
(z6)
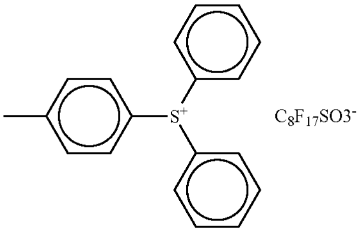
(z7)
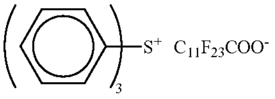
(z8)
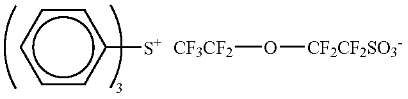
(z9)
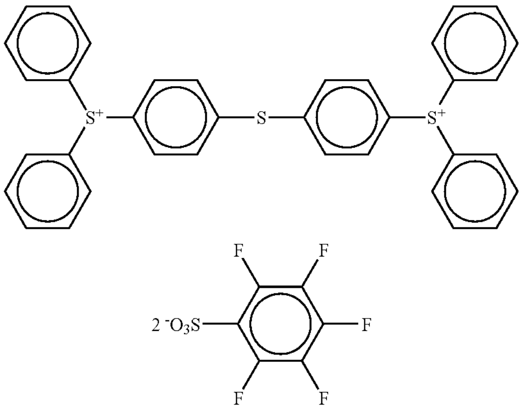
(z10)
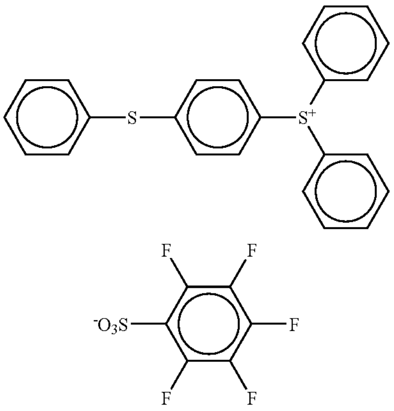
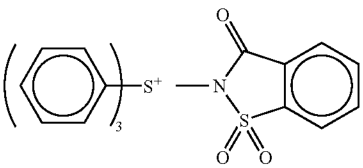
(z12)
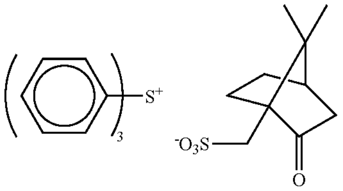
(z13)
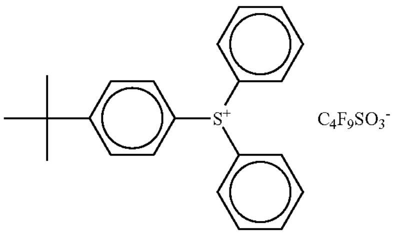
(z14)
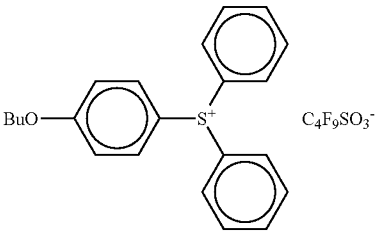

-continued
(z15)
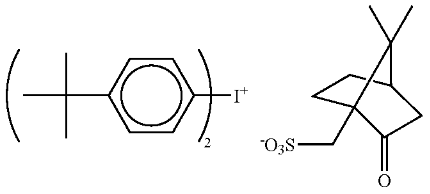
(z-16)
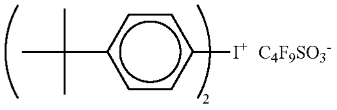
(z17)
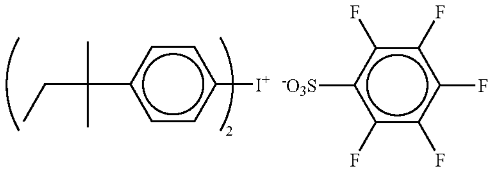
(z18)
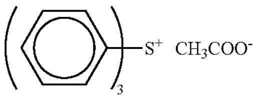
(z19)
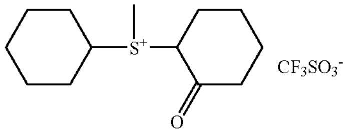
(z20)
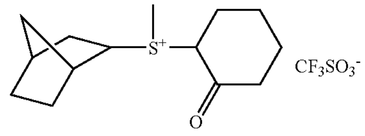
(z21)
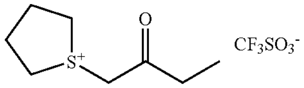
(z22)
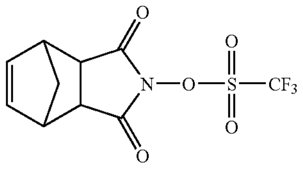
(z23)
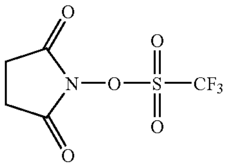
(z24)
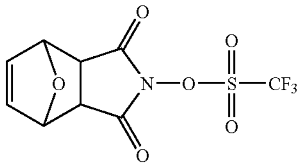
(z25)
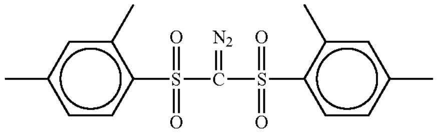
(z26)
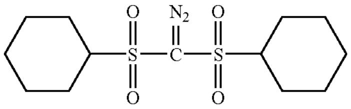
(z27)
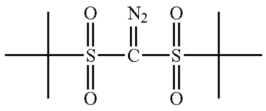
(z28)
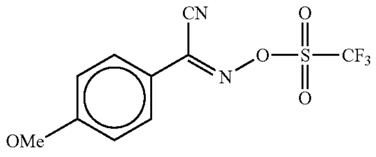
(z29)
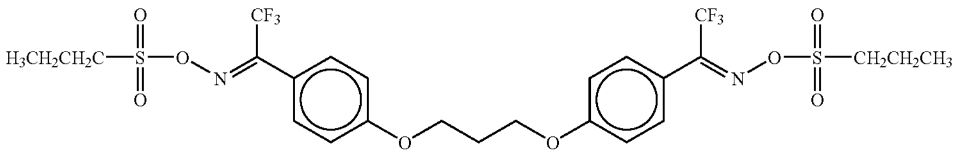
(z30)
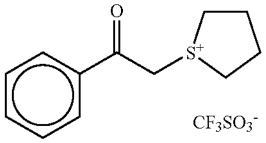
(z31)
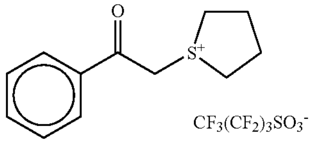

-continued
(z32)
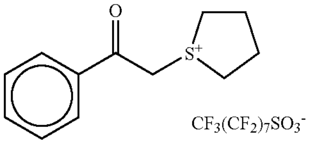
$CF_3(CF_2)_7SO_3^-$
(z33)
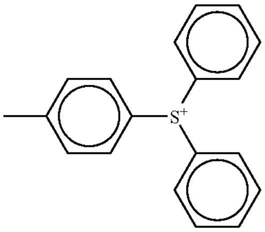
$CF_3(CF_2)_3SO_3^-$
(z34)
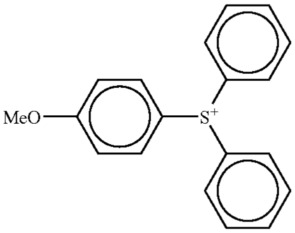
$CF_3(CF_2)_3SO_3^-$
(z35)
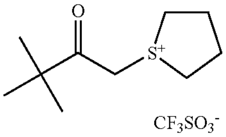
$CF_3SO_3^-$
(z36)
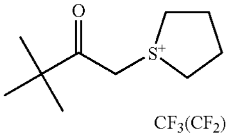
$CF_3(CF_2)_3SO_3^-$
(z37)
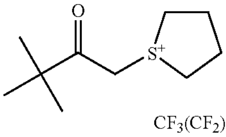
$CF_3(CF_2)_7SO_3^-$
(z38)
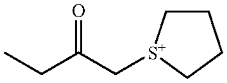
$CF_3(CF_2)_3SO_3^-$
(z39)
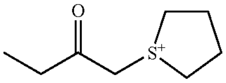
$CF_3(CF_2)_7SO_3^-$
(z40)
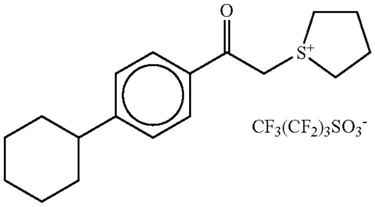
$CF_3(CF_2)_3SO_3^-$
(z41)
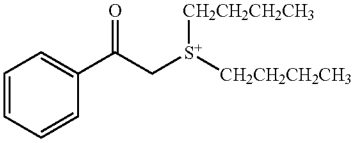
$F_3C(CF_2)_3SO_3^-$
(z42)
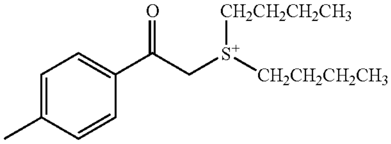
$F_3C(CF_2)_3SO_3^-$
(z43)
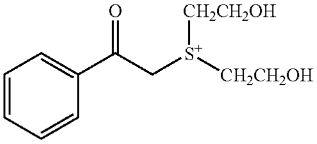
$F_3C(CF_2)_3SO_3^-$
(z44)
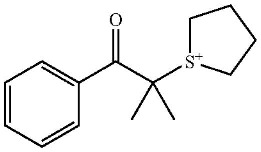
$F_3C(CF_2)_3SO_3^-$
(z45)
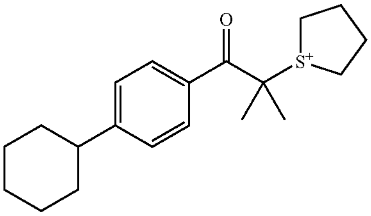
$F_3C(CF_2)_3SO_3^-$
(z46)
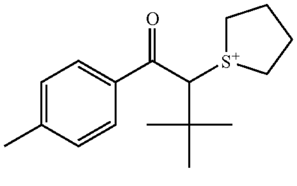
(z47)
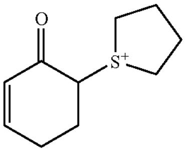
$F_3C(CF_2)_3SO_3^-$ -continued (z48)

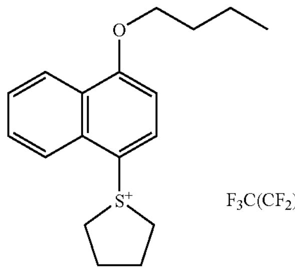

$F_3C(CF_2)_3SO_3^-$

As the photo acid generator, are especially preferable compounds capable of generating a perfluorobutanesulfonic acid upon irradiation with an actinic ray or a radiation, such as z2 to z3, z13 to z14, z16, z31, z33 to z34, z36, z38, and z40 to z48, and compounds capable of generating a perfluorooctanesulfonic acid upon irradiation with an actinic ray or a radiation, such as z6, z32, z37, and z39.

[3] (C) Solvent:

The positive type resist composition of the invention contains an alkoxy alcohol as a solvent (C), wherein an alkoxy group and an alcoholic hydroxyl group are connected to each other via at least three carbons.

As the alkoxy alcohol wherein an alkoxy group and an alcoholic hydroxyl group are connected to each other via at least three carbons, the following compounds can be enumerated.

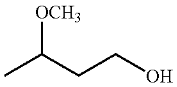

3-Methoxy-butan-1-ol

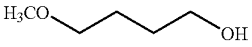

3-Methoxy-butan-1-ol

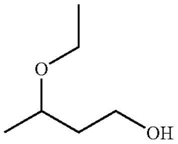

3-Ethoxy-butan-1-ol

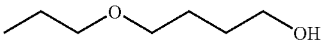

3-Propoxy-butan-1-ol

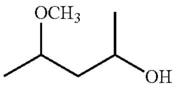

4-Methoxy-pentan-2-ol

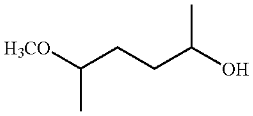

5-Methoxy-hexan-2-ol

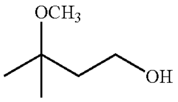

3-Methoxy-3-methyl-butan-1-ol

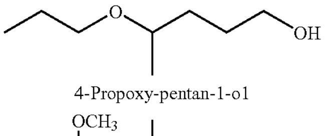

4-Propoxy-pentan-1-ol

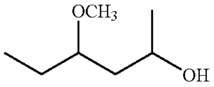

4-Methoxy-hexan-2-ol

The alkoxy alcohol is preferably an alkoxy alcohol in which an alkoxy group and an alcoholic hydroxyl group are connected to each other via from 3 to 10 carbons, more preferably an alkoxy alcohol in which an alkoxy group and an alcoholic hydroxyl group are connected to each other via from 3 to 8 carbons, and further preferably an alkoxy alcohol in which an alkoxy group and an alcoholic hydroxyl group are connected to each other via from 3 to 5 carbons.

The alkoxy alcohol is preferably one connected via at least three carbons and having from 5 to 15 carbon atoms in total, more preferably one connected via at least three carbons and having from 5 to 10 carbon atoms in total, and further preferably one connected via at least three carbons and having from 5 to 8 carbon atoms in total.

The alkoxy alcohol is preferably one connected via at least three carbons and having a boiling point of from 120 to 220° C., more preferably one connected via at least three carbons and having a boiling point of from 130 to 200° C., and further preferably one connected via at least three carbons and having a boiling point of from 140 to 180° C.

The alkoxy alcohol is especially preferably 3-methoxybutanol.

In the invention, it is preferable to further use a propylene glycol monoalkyl ether carboxylate as the solvent (C).

In the case where the alkoxy alcohol and the propylene glycol monoalkyl ether carboxylate are used as the solvent (c), it is preferable to use from 10 to 50% by weight of the alkoxy alcohol and from 50 to 90% by weight of the propylene glycol monoalkyl ether carboxylate.

Examples of the propylene glycol monoalkyl ether carboxylate include propylene glycol monomethyl ether acetate, propylene glycol monoethyl ether acetate, propylene glycol monopropyl ether acetate, propylene glycol monobutyl ether acetate, propylene glycol monomethyl ether propionate, propylene glycol monoethyl ether propionate, propylene glycol monopropyl ether propionate, and propylene glycol monobutyl ether propionate, with propylene glycol monomethyl ether acetate being more preferable.

In the invention, other organic solvents may be used jointly as the solvent (c).

Examples of organic solvents that can be used jointly include cyclohexanone, 2-heptanone, methyl 3-methoxypropionate, ethyl 3-ethoxypropionate, methyl β-methoxyisobutyrate, ethyl butyrate, propyl butyrate, methyl ethyl ketone, ethyl acetate, isoamyl acetate, methyl lactate, ethyl lactate, propylene glycol monomethyl ether, propylene glycol monoethyl ether, toluene, xylene, cyclohexyl acetate, diacetone alcohol, N-methylpyrrolidone, N,N-dimethylformamide, γ-butyrolactone, N,N-dimethylacetamide, cyclopentanone, propylene carbonate, and ethylene carbonate. Above all, propylene glycol monoalkyl ethers and alkyl lactates are preferable, with propylene glycol monomethyl ether and methyl lactate being more preferable.

It is preferable that the amount of other solvent that can be used jointly is not more than 40% by weight in the solvent (C).

It is preferable that the concentration of the solids in the positive type resist composition is preferably from 5 to 15% by weight, and more preferably from 7 to 11% by weight.

[4] (D) Nitrogen-Containing Basic Compound:

Next, (D) a nitrogen-containing basic compound that can be preferably used in the positive type resist composition of the invention will be described. As the nitrogen-containing basic compound (D), organic amines, basic ammonium salts, basic sulfonium salts, etc. are used, and any compounds that do not deteriorate sublimation or resist performance are employable.

Of these nitrogen-containing basic compounds, organic amines are preferable from the standpoint of excellent image performance.

Examples include basic compounds described in JP-A-63-14640, JP-A-5-249662, JP-A-5-127369, JP-A-5-289322, JP-A-5-249683, JP-A-5-289340, JP-A-5-232706, JP-A-5-257282, JP-A-6-242605, JP-A-6-242606, JP-A-6-266100, JP-A-6-266110, JP-A-6-317902, JP-A-7-120929, JP-A-7-146558, JP-A-7-319163, JP-A-7-508840, JP-A-7-333844, JP-A-7-219217, JP-A-7-92678, JP-A-7-28247, JP-A-8-22120, JP-A-8-110638, JP-A-8-123030, JP-A-9-274312, JP-A-9-166871, JP-A-9-292708, JP-A-9-325496, JP-T-7-508840, and U.S. Pat. Nos. 5,525,453, 5,629,134 and 5,667,938.

As the nitrogen-containing basic compound are preferable 1,5-diazabicyclo[4.3.0]-5-nonene, 1,8-diazabicyclo[5.4.0]-7-undecene, 1,4-diazabicyclo[2.2.2]octane, 4-dimethylaminopyridine, 1-naphthylamine, piperidine, hexamethylenetetramine, imidazoles, hydroxypyridines, pyridines, 4,4'-diaminodiphenyl ether, pyridinium p-toluenesulfonate, 2,4,6-trimethylpyridinium p-toluenesulfonate, tetramethylammonium p-toluenesulfonate, tetrabutylammonium lactate, triethylamine, and tributylamine.

Above all are preferable 1,5-diazabicyclo-[4.3.0]-5-nonene, 1,8-diazabicyclo[5.4.0]-7-undecene, 1,4-diazabicyclo[2.2.2]octane, 4-dimethylaminopyridine, 1-naphthylamine, piperidine, hexamethylenetetramine, imidazoles, hydroxypyridines, pyridines, 4,4'-diaminodiphenyl ether, and organic amines such as triethylamine and tributylamine.

The content of the nitrogen-containing basic compound (D) is usually from 0.001 to 10 parts by weight, preferably from 0.001 to 5 parts by weight, and more preferably from 0.001 to 0.5 parts by weight based on 100 parts by weight of the positive type resist composition (solids content).

When the content of the nitrogen-containing basic compound (D) is less than 0.001 parts by weight, a satisfactory effect to be brought by the addition of the component (D) cannot be obtained. On the other hand, when it exceeds 100 parts by weight, there is tendency such as reduction in sensitivity and remarkable deterioration in developability of non-exposed areas. The basic compound (D) can be used singly or in admixture of two pr more thereof.

[5] (E) Fluorine Based and/or Silicon Based Surfactant:

It is preferable that the positive type resist composition of the invention further contains any one of (E) a fluorine based and/or silicon based surfactant (such as fluorine based surfactants, silicon based surfactants, and surfactants containing both a fluorine atom and a silicon atom), or a combination of two or more thereof.

By containing the foregoing fluorine based and/or silicon based surfactant (E) in the positive type resist composition of the invention, it is possible to give resist patterns having good sensitivity and resolution and less adhesion and development failure during use of an exposure light source of not longer than 250 nm, and especially not longer than 220 nm.

Examples of the surfactant (E) include surfactants as described in JP-A-62-36663, JP-A-61-226746, JP-A-61-226745, JP-A-62-170950, JP-A-63-34540, JP-A-7-230165, JP-A-8-62834, JP-A-9-54432, JP-A-9-5988, JP-A-2002-277862, and U.S. Pat. Nos. 5,405,720, 5,360,692, 5,529,881, 5,296,330, 5,436,098, 5,576,143, 5,294,511 and 5,824,451. The following commercially available surfactants can also be used as they are.

Examples of commercially available surfactants that can be used include fluorine based surfactants or silicon based surfactants such as Eftop EF301 and Eftop EF303 (manufactured by Shin Akita Chemical), Fluorad FC430 and Fluorad FC431 (manufactured by Sumitomo 3M), Megaface F171, Megaface F173, Megaface F176, Megaface F189 and Megaface R08 (manufactured by Dainippon Ink and Chemicals, Incorporated), Surflon S-382, Surflon SC101, Surflon 102, Surflon 103, Surflon 104, Surflon 105 and Surflon 106 (manufactured by Asahi Glass Co., Ltd.), and Troy Sol S-366 (manufactured by Troy Chemical Industries, Inc.). Also, a polysiloxane polymer, KP-341 (manufactured by Shin-Etsu Chemical Co., Ltd.) can also be used as the silicon based surfactant.

Besides the foregoing known surfactants, surfactants using fluoro aliphatic group-containing polymers derived from fluoro aliphatic compounds produced by telomerization (often called as “telomer method”) or oligomerization (often called as “oligomer method”) can also be used as the surfactant. Such fluoro aliphatic compounds can be synthesized by the method described in JP-A-2002-90991.

As the fluoro aliphatic group-containing polymer are preferable copolymers of a fluoro aliphatic group-containing monomer and a (poly(oxyalkylene)) acrylate and/or a (poly(oxyalkylene)) methacrylate, which may be irregularly distributed or block copolymerized. As the poly(oxyalkylene) group, a poly(oxyethylene) group, a poly(oxypropylene) group, and a poly(oxybutylene) group can be enumerated, and units containing alkylenes having a different chain length in the same chain, such as a poly(oxyethylene/oxypropylene/oxyethylene block connected body) group and a poly(oxyethylene/oxypropylene block connected body) group can also be enumerated. Moreover, the copolymers of a fluoro aliphatic group-containing monomer and a (poly(oxyalkylene)) acrylate (or methacrylate) include not only binary copolymers but also ternary copolymers or multiple-component polymers obtained by simultaneously copolymerizing two or more different kinds of fluoro aliphatic group-containing monomers and two or more different kinds of (poly(oxyalkylene)) acrylates (or methacrylates).

Examples of commercially available surfactants include Megaface F178, Megaface F-470, Megaface F-473, Megaface F-475, Megaface F-476, and Megaface F-472 (manufactured by Dainippon Ink and Chemicals, Incorproated). Other examples include copolymers of a $C_6F_{13}$ group-containing acrylate (or methacrylate) and a (poly(oxyalkylene)) acrylate (or methacrylate), copolymers of a $C_6F_{13}$ group-containing acrylate (or methacrylate), a (poly(oxyethylene)) acrylate (or methacrylate) and a (poly(oxypropylene) acrylate (or methacrylate), copolymers of a $C_8F_{17}$ group-containing acrylate (or methacrylate) and a (poly(oxyalkylene)) acrylate (or methacrylate), and copolymers of a $C_8F_{17}$ group-containing acrylate (or methacrylate), a (poly(oxyethylene)) acrylate (or methacrylate) and a (poly (oxypropylene) acrylate (or methacrylate).

The amount of the surfactant (E) to be used is preferably from 0.0001 to 2% by weight, and more preferably from 0.001 to 1% by weight based on the total amount of the positive type resist composition (exclusive of the solvent).

If desired, the positive type resist composition of the invention can contain a low-molecular weight acid decomposable compound having a molecular weight of not more than 2,000 and having a group capable of being decomposed by the action of an acid, whose alkali solubility increases by the action of an acid.

Examples of the low-molecular weight acid decomposable compound that can be used include acid decomposable group-containing alicyclic compounds such as cholic acid derivatives, dehydrocholic acid derivatives, deoxycholic acid derivatives, lithocholic acid derivatives, ursocholic acid derivatives, and abietic acid derivatives; and aromatic compounds such as acid decomposable group-containing naphthalene derivatives, as described in *Proc. SPIE,* 2724, 355 (1996), JP-A-8-15865, U.S. Pat. Nos. 5,310,619 and 5,372, 912, and *J. Photopolym. Sci., Tech.*, Vol. 10, No. 3,511 (1997).

Further, low-molecular weight acid decomposable dissolution inhibitory compounds described in JP-A-6-51519 can be used within the range of addition in a level at which transmissibility at 220 nm is not deteriorated. 1,2-Naphthoquinonediazide compounds can also be used.

In the case where the foregoing low-molecular weight acid decomposable dissolution inhibitory compound is used in the resist composition of the invention, its content is usually in the range of from 0.5 to 50 parts by weight, preferably from 0.5 to 40 parts by weight, more preferably from 0.5 to 30 parts by weight, and especially preferably from 0.5 to 20.0 parts by weight based on 100 parts by weight of the resist composition (solids content).

When the low-molecular weight acid decomposable dissolution inhibitory compound is added, not only the foregoing development failure is further improved, not also the dry etching resistance is improved.

If desired, the positive type resist composition of the invention can further contain a dissolution promoting compound against the developing solution, a halation inhibitor, a plasticizer, a surfactant, a photosensitizer, an adhesive aid, a crosslinking agent, and a photo base generator.

Examples of the dissolution promoting compound against the developing solution, which can be used in the invention, include low-molecular weight compounds having a molecular weight of not more than 1,000, such as compounds having two or more phenolic hydroxyl groups as described in JP-A-3-206458, naphthols such as 1-naphthol, compounds having one or more carboxyl groups, carboxylic anhydrides, sulfonamide compounds, and sulfonylimide compounds.

The compounding amount of the dissolution promoting compound is preferably not more than 30% by weight, and more preferably not more than 20% by weight based on the total weight of the composition (solids content).

As the halation inhibitor, compounds capable of effectively absorbing a radiation to be irradiated are suitable. Examples include substituted benzenes such as fluorene, 9-fluorenone, and benzophenone; and polycyclic aromatic compounds such as anthracene, anthracene-9-methanol, anthracene-9-carboxyethyl, phenanthrene, perylene, and azirene. Above all, polycyclic aromatic compounds are especially preferable. The halation inhibitor reduces reflective light from a substrate and minimizes influences of multiple reflection within the resist film, thereby revealing an effect of standing water improvement.

Also, for the sake of improving the acid generation factor by exposure, a photosensitizer can be added. Suitable examples of the photosensitizer include benzophenone, p,p'-tetramethyldiaminobenzophenone, 2-chlorothioxanthone, anthrone, 9-ethoxyanthracene, pyrene, phenothiazine, benzil, benzoflavine, acetophenone, phenanthrene, benzoquinone, anthraquinone, and 1,2-naphthoquinone. However, it should not be construed that the invention is limited thereto. The photosensitizer can also be used as the foregoing halation inhibitor.

<<Use Method>>

The positive type resist composition of the invention is used by dissolving the foregoing components in the solvent (C) and after filtering, coating the solution on a prescribed support in the following manner.

That is, the foregoing positive type resist composition is coated on a substrate as used for fabrication of large scale integration circuits (such as silicon/silicon dioxide-coated substrates) in an appropriate coating method using a spinner, a coater, etc. and then heated to form a resist film.

Next, the resulting resist film is exposed through a prescribed mask and heated to undergo development. There can be thus obtained a good resist pattern. As the exposure ray as used herein, are preferable far ultraviolet rays having a wavelength of not longer than 250 nm, and more preferable those having a wavelength of not longer than 220 nm. Specific examples include KrF excimer laser (248 nm), ArF excimer laser (193 nm), $F_2$ excimer laser (157 nm), X rays, and electron beams.

Examples of the alkaline developing solution for the positive type resist composition of the invention include alkaline aqueous solutions such as inorganic alkalis such as sodium hydroxide, potassium hydroxide, sodium carbonate, sodium silicate, sodium metasilicate, and ammonia water; primary amines such as ethylamine and n-propylamine; secondary amines such as diethylamine and di-n-butylamine; tertiary amines such as triethylamine and methyldiethylamine; alcoholamines such as dimethylethanolamine and triethanolamine; quaternary ammonium salts such as tetramethylammonium hydroxide and tetraethylammonium hydroxide; and cyclic amines such as pyrrole and piperidine.

Further, suitable amounts of alcohols and surfactants can be added to the foregoing alkaline developing solution.

The alkali concentration of the alkaline developing solution is usually from 0.1 to 20% by weight, preferably from 0.2 to 15% by weight, and more preferably from 0.5 to 10% by weight.

The pH of the alkaline developing solution is usually from 10.0 to 15.0, preferably from 10.5 to 14.5, and more preferably from 11.0 to 14.0.

EXAMPLES

The invention will be described below in more detail with reference to the following Examples, but it should not be construed that the invention is limited thereto.

Synthesis Example (1)

Synthesis of Resin (1)

2-Ethyl-2-adamantyl methacrylate and butyrolactone methacrylate were-charged in a proportion of 55/45, and the mixture was dissolved in methyl ethyl ketone/tetrahydrofuran (5/5) to prepare 100 mL of a solution having a solids content of 20%. To this solution was 2 mol % of V-65 manufactured by Wako Pure Chemical Industries, Ltd., and the mixture was added dropwise to 10 mL of methyl ethyl ketone heated at 60° C. over 4 hours in a nitrogen atmosphere. After completion of the dropwise addition, the reaction mixture was heated for 4 hours, to which was then again added 1 mol % of V-65, and the mixture was stirred for 4 hours. After completion of the mixture, the reaction mixture was cooled to room temperature and crystallized from 3 L of a mixed solvent of distilled water/isopropyl alcohol (1/1), to recover Resin (1) as a deposited white powder.

This resin had a polymer formulation ratio, as determined from $C^{13}$-NMR, of 46/54. Also, the resin had a weight average molecular weight, as reduced into standard polystyrene by the GPC measurement, of 10,700.

Resins (2) to (10) were synthesized in the same manner as in the foregoing Synthesis Example (1). The formulation and molecular weight of each of the foregoing Resins (2) to (10) are shown in Table 1 below. (The repeating units 1, 2, 3 and 4 are in order from the left side of each structural formula.)

TABLE 1

| Resin | Repeating unit 1 (mol % | Repeating unit 2 (mol %) | Repeating unit 3 (mol %) | Repeating unit 4 (mol %) | Molecular weight |
|---|---|---|---|---|---|
| 2 | 42 | 31 | 27 | — | 8300 |
| 3 | 42 | 30 | 28 | — | 10300 |
| 4 | 39 | 35 | 26 | — | 8900 |
| 5 | 46 | 22 | 30 | 2 | 12900 |
| 6 | 38 | 32 | 30 | — | 11300 |
| 7 | 50 | 20 | 20 | 10 | 11500 |
| 8 | 40 | 40 | 20 | — | 12300 |
| 9 | 40 | 40 | 20 | — | 11300 |
| 10 | 30 | 30 | 10 | 30 | 11500 |

Also, the structures of the foregoing Resins (1) to (10) are as follows.

(1)

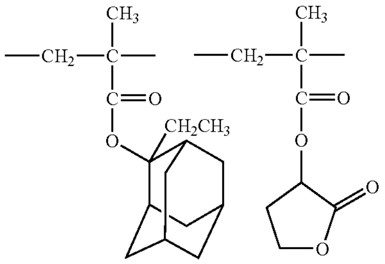

(2)

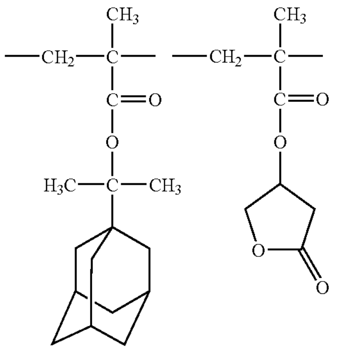

-continued

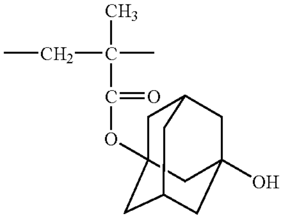

(3)

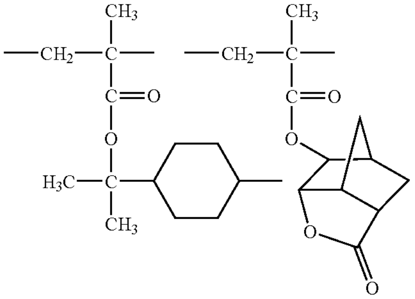

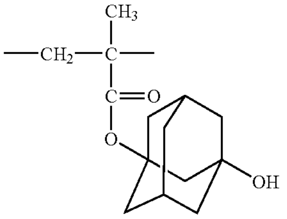

(4)

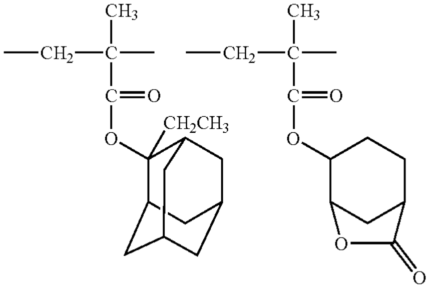

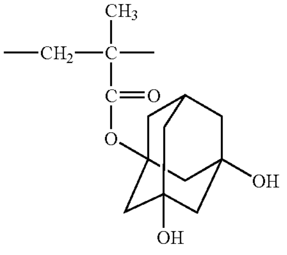

(5)

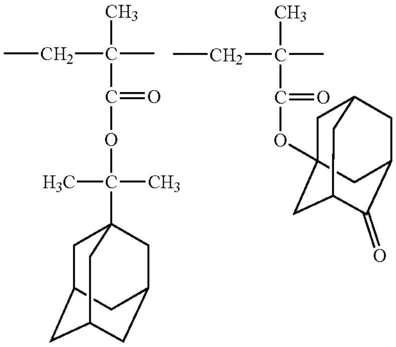

-continued
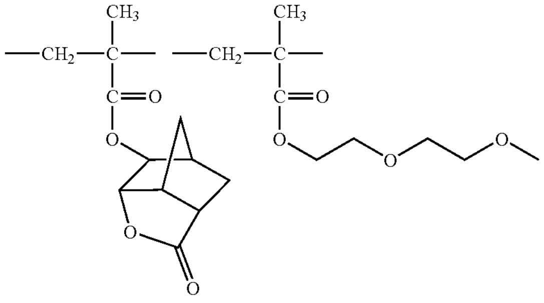
(6)
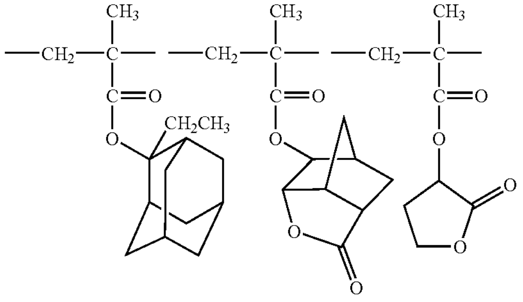
(7)
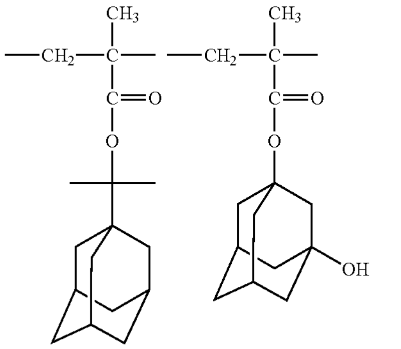
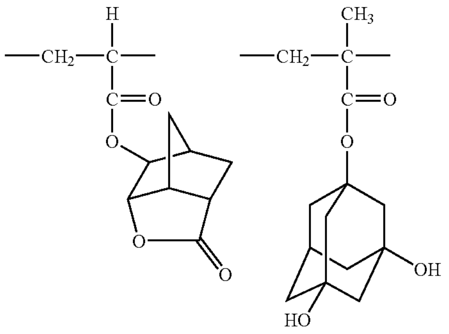
-continued
(8)
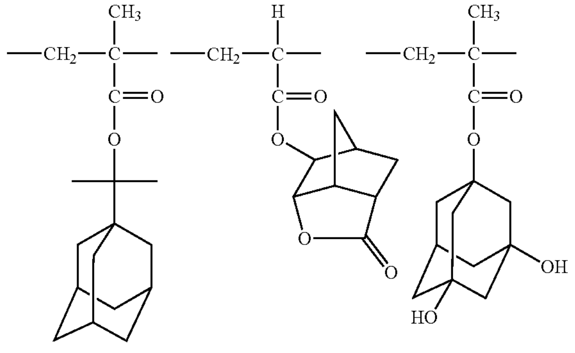
(9)
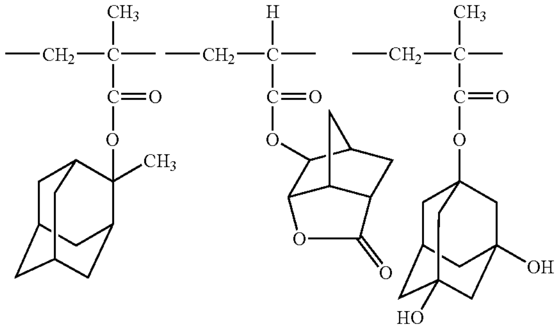
(10)
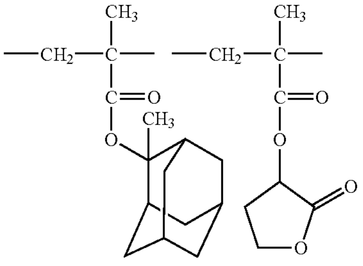
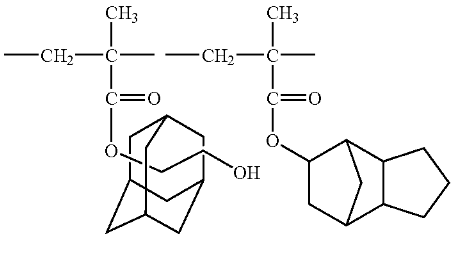

Examples 1 to 12 and Comparative Examples 1 to 2

Preparation and Evaluation of Positive Type Resist Composition

A resin (1.03 g), a photo acid generator (0.00035 moles), a nitrogen-containing basic compound (1.65 mg), and a surfactant (100 ppm in the whole) were compounded as shown in Table 2, and the mixture was dissolved in a solvent as shown in Table 2 such that the solids content became 11% by weight. Thereafter, the solution was filtered through a 0.1-μm micro-filter. There were thus prepared positive type resist compositions of Examples 1 to 12 and Comparative Examples 1 to 2.

TABLE 2

| | Resin | Photo acid generator (molar ratio) | Nitrogen-containing basic compound | Surfactant (weight ratio) | Solvent (weight ratio) | Change in sensitivity (%) | Affinity for developer (%) |
|---|---|---|---|---|---|---|---|
| Example 1 | (1) | z34 | N-1 | W-1 | SL-1 | 2 | 94 |
| Example 2 | (2) | z34/z31 (1/2) | N-2 | W-2 | SL-2 | 3 | 90 |
| Example 3 | (3) | z33 | N-3 | W-3 | SL-3 | 3 | 89 |
| Example 4 | (4) | z33 | N-4 | W-4 | SL-4 | 4 | 86 |
| Example 5 | (5) | z34 | N-5 | W-1 | SL-1/SL-5 (2/3) | 3 | 92 |
| Example 6 | (6) | z34/z40 (1/2) | N-6 | W-2 | SL-2/SL-5 (1/1) | 5 | 91 |
| Example 7 | (7) | z14 | N-7 | W-3 | SL-1/SL-6 (2/3) | 1 | 83 |
| Example 8 | (8) | z33/z31 (1/2) | N-5 | W-4 | SL-2/SL-6 (2/3) | 0 | 81 |
| Example 9 | (9) | z33/z31 (1/2) | N-6 | W-1 | SL-2/SL-8/SL-6 (1/3/6) | 4 | 88 |
| Example 10 | (10) | z33/z31 (1/2) | N-7 | W-2 | SL-4/SL-8/SL-6 (1/3/6) | 3 | 88 |
| Example 11 | (7) | z33/z31 (1/2) | N-1 | W-3/W-1 (1/1) | SL-1/SL-7 (1/1) | 1 | 82 |
| Example 12 | (8) | z33/z31 (1/2) | N-2 | W-4/W-2 (1/1) | SL-1/SL-8/SL-6 (1/3/6) | 2 | 82 |
| Comparative Example 1 | (11) | z34 | N-6 | W-1 | SL-6 | 20 | 100 |
| Comparative Example 2 | (1) | z5 | N-6 | W-1 | SL-6/SL-8 (3/2) | 18 | 98 |

The nitrogen-containing basic compound used are as follows:

| | |
|---|---|
| N-1: | 1,5-Diazabicyclo[4.3.0]-5-nonene |
| N-2: | 1,8-Diazabicycio[5.4.0]-7-undecene |
| N-3: | 4-Dimethylaminopyridine |
| N-4: | Triphenylimidazole |
| N-5: | Dilsopropylaniline |
| N-6: | Tributylamine |
| N-7: | Trioctylamine |

The surfactant used are as follows:

| | |
|---|---|
| W-1: | Megaface F176 (manufactured by Dainippon Ink and Chemicals, Incorporated) (fluorine based) |
| W-2: | Megaface R08 (manufactured by Dainippon Ink and Chemicals, Incorporated) (fluorine and silicon based) |
| W-3: | Polysiloxane polymer, KP-341 (manufactured by Shin-Etsu Chemical Co., Ltd.) |
| W-4: | Troy Sol S-366 (manufactured by Troy Chemical Industries, Inc.) |

The solvent used are as follows:

| | |
|---|---|
| SL-1: | 3-Methoxy-1-butanol |
| SL-2: | 3-Methoxy-3-methylbutanol |
| SL-3: | 3-Ethoxy-1-butanol |
| SL-4: | 4-Methoxy-2-pentanol |
| SL-5: | Methyl lactate |
| SL-6: | Propylene glycol monomethyl ether acetate |
| SL-7: | Propylene glycol monomethyl ether propionate |
| SL-8: | Propylene glycol monomethyl ether |

Resin (11) in Comparative Example 1 is as follows.

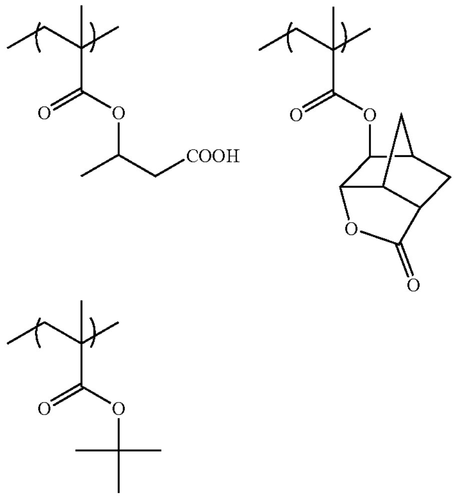

5/40/55 (Mw 8800)

<Evaluation of Change in Sensitivity with Time>

ARC29a (manufactured by Brewer Science, Inc.) was uniformly coated in a thickness of 780 angstroms on a silicon wafer treated with hexamethyl disilazane using a spin coater, dried at 100° C. for 90 seconds on a hot plate, and then heated and dried at 205° C. for 60 seconds to from an antireflection film. Thereafter, each of the positive type resist solutions immediately after the preparation was coated thereon using a spin coater and dried at 120° C. for 90 seconds to form a 0.30 μm-thick resist film.

The resist film was exposed by an ArF excimer laser stepper (manufactured by ISI, Inc., NA=0.6) through a mask and immediately after the exposure, heated at 120° C. for 90 seconds on a hot plate. Further, the resulting resist film was developed with a 2.38% by weight tetramethylammonium hydroxide aqueous solution at 23° C. for 60 seconds, rinsed with pure water for 30 seconds, and then dried to obtain a resist line pattern.

The sensitivity was expressed in terms of an exposure amount capable of reproducing a 0.15-μm line-and-space (1/1) pattern.

Next, after the preparation, each of the positive type resist compositions having been preserved at room temperature for 90 days was measured for sensitivity in the same manner and evaluated for change in sensitivity with time. The results were shown in Table 2.

<Evaluation of Affinity for Developer>

A silicon wafer on which an antireflection film and a resist film had been formed in the same manner as described previously was held on a horizontal electronic force balance, and while gradually dropping an alkaline developing solution from the center of the wafer, the weight of the alkaline developing solution was measured just before the alkaline developing solution fell down. The weight of the alkaline developing solution of each of the Examples was shown in Table 2 while taking the weight of the alkaline developing solution of Comparative Example 1 as 100%. When the numeral value is small, it is possible to spread the alkaline developing solution in a small amount over the entire surface of the wafer, meaning excellent spreading property of a developing solution.

It is noted from Table 2 that the positive type resist composition of the invention is small in changes in sensitivity with time and excellent in spreading property of a developing solution.

According to the invention, it is possible to provide a positive type resist composition that is small in changes in sensitivity with time and excellent in spreading property of a developing solution.

What is claimed is:

1. A positive resist composition comprising:

(A) a resin having a monocyclic or polycyclic alicyclic hydrocarbon structure, which increases its solubility in an alkali developing solution by the action of an acid;

(B) a compound capable of generating an acid upon irradiation with an actinic ray or actinic radiation; and (C) an alkoxy alcohol as a solvent, wherein an alkoxy group and an alcoholic hydroxyl group are connected to each other via at least three carbons, wherein the resin (A) comprises a repeating unit having an alkali-soluble group protected by a 2-alkyl-2-adamantyl group or a 1-adamantyl-1-alkylalkyl group.

2. The composition according to claim 1, wherein the solvent (C) further contains a propylene glycol monoalkyl ether carboxylate.

3. The composition according to claim 2, wherein the solvent (C) contains from 10 to 50% by weight of the alkoxy alcohol and from 50 to 90% by weight of the propylene glycol monoalkyl ether carboxylate.

4. The composition according to claims 1, wherein the alkoxy alcohol is 3-methoxybutanol.

5. The composition according to claim 2, wherein the propylene glycol monoalkyl ether carboxylate is propylene glycol monomethyl ether acetate.

6. The composition according to claim 1, wherein the resin (A) comprises a repeating unit having a group represented by the following formula (I):

(I)

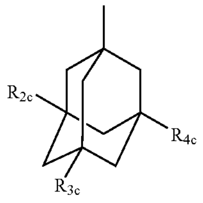

wherein $R_{2c}$, $R_{3c}$, and $R_{4c}$ each independently represents a hydrogen atom or a hydroxyl group, provided that at least one of $R_{2c}$, $R_{3c}$, and $R_{4c}$ represents a hydroxyl group.

7. The composition according to claim 1, wherein the compound (B) is a compound capable of generating a perfluorobutanesulfonic acid or a perfluorooctanesulfonic acid upon irradiation with an actinic ray or a radiation.

8. The composition according to claim 1, wherein the alkoxy group and the alcoholic hydroxyl group are connected to each other via from 3 to 10 carbons.

9. The composition according to claim 1, wherein the alkoxy alcohol has a boiling point of from 120 to 220° C.

10. The composition according to claim 1, further comprising (D) a nitrogen-containing basic compound.

11. The composition according to claim 1, further comprising (E) a fluorine based and/or silicon based surfactant.

12. A method for forming a pattern, which comprises forming a resist film comprising the composition described in claim 1, exposing the resist film upon irradiation with the actinic rays or a radiation, and subsequently developing the resist film.

* * * * *